US011334970B2

(12) United States Patent
Baek

(10) Patent No.: US 11,334,970 B2
(45) Date of Patent: *May 17, 2022

(54) ENHANCING A DIGITAL IMAGE

(71) Applicant: Dropbox, Inc., San Francisco, CA (US)

(72) Inventor: Jongmin Baek, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/866,324

(22) Filed: May 4, 2020

(65) Prior Publication Data

US 2020/0265560 A1 Aug. 20, 2020

Related U.S. Application Data

(63) Continuation of application No. 16/368,518, filed on Mar. 28, 2019, now Pat. No. 10,643,314, which is a
(Continued)

(51) Int. Cl.
*G06T 5/00* (2006.01)
*G06T 7/11* (2017.01)
*G06T 7/168* (2017.01)
*G06T 5/20* (2006.01)
*G06T 7/12* (2017.01)
(Continued)

(52) U.S. Cl.
CPC ............ *G06T 5/005* (2013.01); *G06T 5/008* (2013.01); *G06T 5/20* (2013.01); *G06T 7/11* (2017.01); *G06T 7/12* (2017.01); *G06T 7/136* (2017.01); *G06T 7/168* (2017.01); *G06T 1/0007* (2013.01); *G06T 2207/10004* (2013.01); *G06T 2207/10024* (2013.01); *G06T 2207/20012* (2013.01); *G06T 2207/20028* (2013.01); *G06T 2207/20112* (2013.01)

(58) Field of Classification Search
None
See application file for complete search history.

(56) References Cited

U.S. PATENT DOCUMENTS 5,065,344 A 11/1991 Kishimoto et al.
6,043,900 A 3/2000 Feng et al.
(Continued)

OTHER PUBLICATIONS

Dickson, Paul E., W. Richards Adrion, and Allen R. Hanson. "Whiteboard content extraction and analysis for the classroom environment." 2008 Tenth IEEE International Symposium on Multimedia. IEEE, 2008. (Year: 2008).*
(Continued)

*Primary Examiner* — Andrae S Allison
(74) *Attorney, Agent, or Firm* — Keller Preece PLLC

(57) ABSTRACT

One or more embodiments of an image enhancement system enable a computing device to generate an enhanced digital image. In particular, a computing device can enhance a digital image including, for example, a photograph of a whiteboard, document, chalkboard, or other object having a uniform background. The computing device can determine modifications to apply to the digital image by minimizing an energy heuristic that both causes pixels of the digital image to change to a uniform color (e.g., white) and preserves gradients from the digital image. The computing device can further generate an enhanced digital image by applying the determined modifications to the digital image.

20 Claims, 9 Drawing Sheets

Related U.S. Application Data continuation of application No. 15/722,806, filed on Oct. 2, 2017, now Pat. No. 10,290,086, which is a continuation of application No. 14/971,733, filed on Dec. 16, 2015, now Pat. No. 9,799,106.

(51) Int. Cl.
  *G06T 7/136* (2017.01)
  *G06T 1/00* (2006.01)

(56) References Cited

U.S. PATENT DOCUMENTS

| | | | |
|---|---|---|---|
| 6,460,032 B1 | 10/2002 | Ludtke et al. | |
| 7,305,127 B2 | 12/2007 | Wells | |
| 7,397,504 B2 | 7/2008 | Cutler et al. | |
| 7,499,588 B2 | 3/2009 | Jacobs et al. | |
| 8,098,936 B2 | 1/2012 | Guerzhoy et al. | |
| 8,189,913 B2 | 5/2012 | Huang et al. | |
| 8,244,062 B2* | 8/2012 | Dey | G06K 9/3283 382/276 |
| 8,295,606 B2 | 10/2012 | Li et al. | |
| 8,306,336 B2 | 11/2012 | Jiang et al. | |
| 8,379,979 B2 | 2/2013 | Yu et al. | |
| 8,861,892 B2 | 10/2014 | Yu et al. | |
| 9,336,483 B1 | 5/2016 | Abeysooriya et al. | |
| 9,626,361 B2 | 4/2017 | Greenwood et al. | |
| 9,661,239 B2* | 5/2017 | Guissin | G06T 5/50 |
| 9,799,106 B2 | 10/2017 | Baek et al. | |
| 10,643,314 B2* | 5/2020 | Baek | G06T 5/008 |
| 2003/0095709 A1* | 5/2003 | Zhou | G06T 7/12 382/190 |
| 2004/0042680 A1* | 3/2004 | Saund | G06T 7/194 382/274 |
| 2004/0146198 A1* | 7/2004 | Herley | H04N 1/00708 382/173 |
| 2004/0165786 A1* | 8/2004 | Zhang | H04N 1/387 382/276 |
| 2004/0189674 A1* | 9/2004 | Zhang | H04N 1/19594 345/629 |
| 2004/0249809 A1 | 12/2004 | Ramani et al. | |
| 2005/0180632 A1* | 8/2005 | Aradhye | G06K 9/3258 382/182 |
| 2005/0180635 A1* | 8/2005 | Trifonov | G06T 7/12 382/199 |
| 2006/0082849 A1 | 4/2006 | Kaku | |
| 2007/0104389 A1 | 5/2007 | Wells | |
| 2007/0122039 A1 | 5/2007 | Zhang et al. | |
| 2007/0133900 A1 | 6/2007 | Nielsen et al. | |
| 2008/0025635 A1 | 1/2008 | Han et al. | |
| 2008/0056572 A1 | 3/2008 | Nielsen et al. | |
| 2012/0163728 A1* | 6/2012 | Sun | G06T 5/009 382/260 |
| 2013/0216116 A1 | 8/2013 | Yim et al. | |
| 2014/0006385 A1 | 1/2014 | Ebers et al. | |
| 2015/0163376 A1 | 6/2015 | Pan et al. | |
| 2015/0235080 A1 | 8/2015 | Pan et al. | |
| 2015/0324434 A1 | 11/2015 | Greenwood et al. | |
| 2017/0220692 A1 | 8/2017 | Greenwood et al. | |
| 2017/0309003 A1 | 10/2017 | Bako et al. | |
| 2018/0122054 A1 | 5/2018 | Baek | |

OTHER PUBLICATIONS

He, Li-Wei, and Zhengyou Zhang. "Real-time whiteboard capture and processing using a video camera for remote collaboration." IEEE Transactions on Multimedia 9.1 (2006): 198-206. (Year: 2006).*

Anton M., et al., "Continuous Energy Minimization for Multi target Tracking," IEEE Transactions on Pattern Analysis and Machine Intelligence, 2014, vol. 36(1), 15 pages.

Azadboni M.K., et al., "Text Detection and Character Extraction in Color Images using FFT Domain Filtering and SVM Classification," Telecommunications (IST), 2012 Sixth International Symposium on IEEE, 2012, pp. 794-799.

Bai Y., et al., "Bag-of-words Based Deep Neural Network for Image Retrieval," Proceedings of the 22nd ACM international conference on Multimedia, ACM, 2014, 4 pages.

Chen L., et al., "Depth Image Enhancement for Kinect Using Region Growing and Bilateral Filter," 21st International Conference on Pattern Recognition (ICPR 2012), Nov. 11-15, 2012, pp. 3070-3073.

Crabb R., et al., "Real-time Foreground Segmentation via Range and Color Imaging," Computer Vision and Pattern Recognition Workshops, CVPRW08, IEEE Computer Society Conference 2008, 5 pages.

Denman S., et al., "Improved Simultaneous Computation of Motion Detection and Optical Flow for Object Tracking," in Proceedings of the Digital Image Computing: Techniques and Applications, DICTA, Dec. 2009, pp. 175-182.

Dickson E.P., et al., "Whiteboard Content Extraction and Analysis for the Classroom Environment," Multimedia, 2008, Tenth IEEE International Symposium on IEEE, 2008, pp. 702-707.

He L., et al., "Real-Time Whiteboard Capture and Processing Using a Video Camera for Remote Collaboration," IEEE Transactions on Multimedia, 2007, vol. 9, pp. 198-206.

He Y., et al., "Enhancement of Camera-based Whiteboard Images," IS&T/SPIE Electronic Imaging, International Society for Optics and Photonics, 2010, 8 pages.

Hu, et al., "Moving Object Detection and Tracking from Video Captured by Moving Camera," Journal of Visual Communication and Image Representation, 2015, vol. 30, pp. 164-180.

Hua G, et al., "Automatic Business Card Scanning with a Camera." Image Processing, International Conference on IEEE, 2006, pp. 373-376.

Hua G, et al., "Automatic Segmentation of Objects of Interest from an Image," Technical Report, Oct. 2006, 30 pages.

Levine D M., et al., "Removing shadows," 2005, Pattern Recognition Letters 26, pp. 251-265.

Liang R., et al., "Aviation Video Moving-target Detection with Inter-Frame Difference," in Proceedings of the 2010 3rd International Congress on Image and Signal Processing, CISP 2010, Oct. 2010, pp. 1494-1497.

Morel J.M., et al., "Screened Poisson equation for image contrast enhancement," Image Processing on Line 4, 2014, pp. 16-29.

Non-Final Office Action for U.S. Appl. No. 15/722,806 dated Jun. 15, 2018, 14 pages.

Non-Final Office Action for U.S. Appl. No. 15/722,806 dated Sep. 17, 2018, 17 pages.

Non-Final Office Action from U.S. Appl. No. 16/368,518, dated Oct. 31, 2019, 13 pages.

Notice of Allowance for U.S. Appl. No. 15/722,806 dated Jan. 15, 2019, 9 pages.

Notice of Allowance from U.S. Appl. No. 16/368,518, dated Feb. 28, 2020, 8 pages.

Notice of Allowance for U.S. Appl. No. 14/971,733 dated Jun. 2, 2017, 8 pages.

Office Action for U.S. Appl. No. 14/971,733 dated Jan. 27, 2017, 21 pages.

* cited by examiner

ENHANCING A DIGITAL IMAGE

CROSS REFERENCE TO RELATED APPLICATIONS

This application is a continuation of U.S. application Ser. No. 16/368,518, filed on Mar. 28, 2019, which is a continuation of U.S. application Ser. No. 15/722,806, filed Oct. 2, 2017, now issued as U.S. Pat. No. 10,290,086, which is a continuation of U.S. application Ser. No. 14/971,733, filed Dec. 16, 2015, now issued as U.S. Pat. No. 9,799,106. The aforementioned applications are hereby incorporated by reference in their entirety.

BACKGROUND

1. Technical Field

One or more embodiments of the present disclosure relate to enhancing digital images. More specifically, one or more embodiments disclosed herein relate to systems and methods for enhancing a foreground of an image by making a background of the image uniform.

2. Background and Relevant Art

Computing devices (e.g., computers, tablets, smart phones) provide numerous ways to store and view digital content items. For example, many computing devices enable users to capture and store digital photographs (or simply "digital photos") of documents, whiteboards, chalkboards, or other digital photos that includes foreground content (e.g., text, lines, handwriting) on a background. In capturing, scanning, transferring, and storing digital photos, various flaws or imperfections may be introduced and diminish the quality of the digital photos.

For example, digital photos of documents, whiteboards, or chalkboards often include various imperfections that diminish the quality of the digital photos. In particular, conditions in which digital photos of documents, whiteboards, or chalkboards are captured often contribute to various flaws that are introduced. In particular, perspective and/or lighting issues often cause digital photos of documents, whiteboards, or other images having a background to have non-white or off-color backgrounds when captured by a camera. Additionally, digital photos often include other non-uniformities in the background such as glare, shadows, vignetting, variations in illumination, or other flaws introduced as a result of non-ideal photo capturing conditions.

In order to compensate for various flaws that are introduced as a result of imperfect conditions and/or various properties of digital photos, conventional systems often process digital photos to generate a cleaned up or otherwise enhanced version of the digital photos. For example, conventional systems often analyze an image to identify content and/or remove various flaws. Conventional systems, however, experience difficulty when analyzing and enhancing digital photos that include handwritten content and/or digital photos including content on various backgrounds (e.g., documents, whiteboards, chalkboards).

Additionally, as a result of various flaws introduced when capturing and/or modifying (e.g., converting) a digital photo, conventional systems often fail to accurately identify and remove various flaws from within a digital photo. For example, as a result of off-color backgrounds, shadows, glare, and other non-uniformities, conventional systems often fail to distinguish between foreground content and a background of digital photos. As such, conventional systems often fail to meaningfully enhance digital photos that include handwritten content and/or other digital photos that include documents, whiteboards, chalkboards, or other digital images having particular backgrounds.

In particular, conventional systems often fail to identify or maintain relevant information when enhancing or otherwise processing a digital photo. For example, when content and/or backgrounds of a digital photo includes content having different shades of color or gray on a gray or off-color background, conventional systems often fail to preserve lighter shades of color or gray and thus exclude relevant information when providing a cleaned up version of the digital photo. As such, relevant information is often lost when processing and enhancing digital photos.

Accordingly, there are a number of considerations to be made in enhancing digital images.

SUMMARY

Embodiments of the present disclosure provide benefits and/or solve one or more of the foregoing or other problems in the art with systems and methods for enhancing digital content. In particular, the image enhancement systems and methods described herein enhance an input image by determining modifications to enhance the input image and further applying the determined modifications to the input image to generate an output image with an enhanced foreground. For example, systems and methods described herein include features and functionality that enhance a digital image that includes a photograph of a document, whiteboard, or other image having foreground content on a uniform background. In particular, one or more embodiments include generating an enhanced image by modifying an input image to remove glare, shadows, faded color, and/or other flaws from a background portion of the input image. Additionally, one or more embodiments include enhancing a foreground portion of the input image by preserving foreground data (e.g., foreground pixels) from within the input image when generating the enhanced image.

Further, one or more embodiments include features and functionality that enable systems and methods to accurately remove various flaws from within a digital image notwithstanding a color and/or other non-uniformities within a background of the digital image. In particular, one or more embodiments include determining modifications to enhance a digital image by causing background pixels of the digital image to change to a uniform color. For example, in the case that the digital image includes a photograph of a document or whiteboard, one or more embodiments include modifying the digital image by causing pixels of portions of the input image (e.g., a background portion) to be white. Thus, the background of an enhanced digital image can include white or otherwise uniform pixels that enhance the experience of a user when viewing the enhanced digital image.

Additionally, one or more embodiments include features and functionality that enable systems and methods to preserve content within a foreground portion of the digital image. In particular, one or more embodiments include determining modifications to enhance the digital image by preserving foreground data (e.g., pixels of foreground content) from within the digital image. For example, in the case that the digital image includes handwritten text having various colors or different hues of gray, one or more embodiments preserve foreground data from within the digital image when applying determined modifications to the digital image to generate the enhanced digital image with an enhanced foreground. Thus, systems and methods can generate an enhanced digital image having a more pronounced or otherwise enhanced foreground portion.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1A:
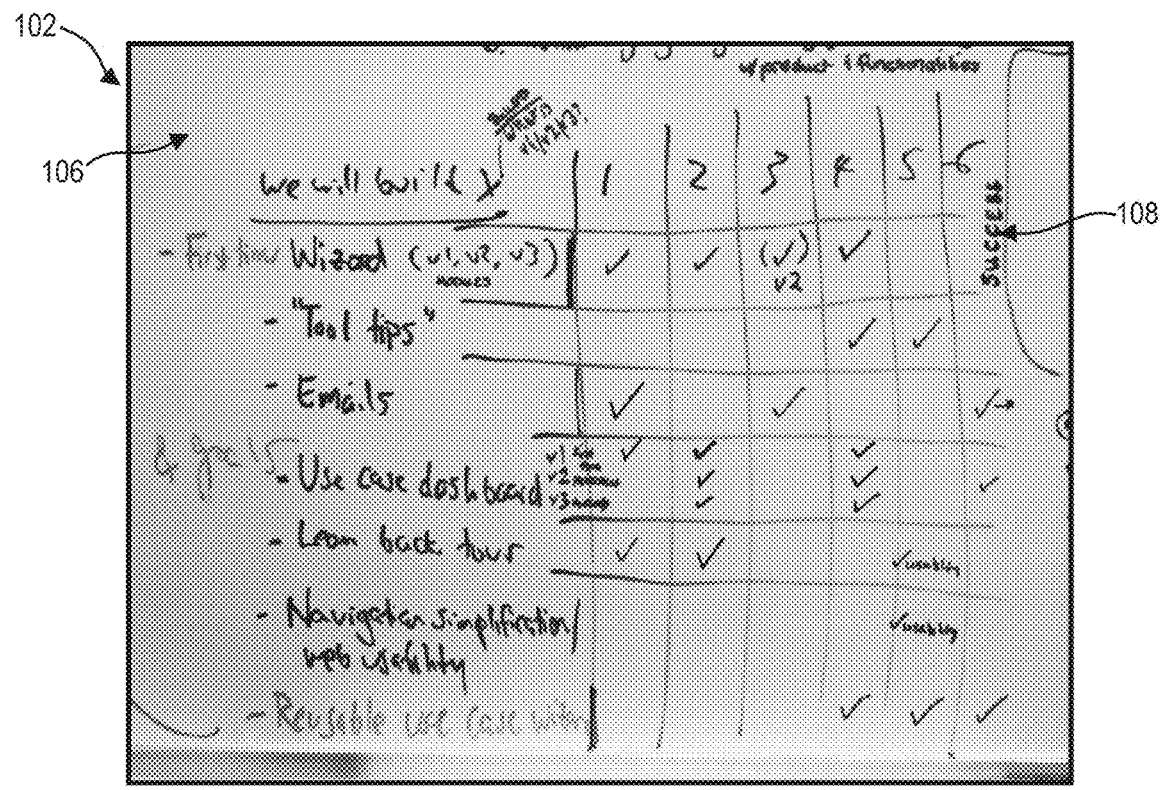
FIG. 1A illustrates an example digital image including a photograph of a whiteboard in accordance with one or more embodiments.

The present disclosure provides one or more embodiments of an image enhancement system that enhances digital images. In particular, the image enhancement system enhances an input image to generate an output image with an enhanced foreground by determining and applying modifications to the input image. For example, the image enhancement system can access an input image including a background and a foreground. The image enhancement system can further determine modifications to enhance the input image by causing background pixels of the input image to change to a uniform color while preserving gradients (e.g., foreground) of the input image. Further, the image enhancement system can generate an output image with an enhanced foreground by applying the determined modifications to the input image.

For example, when an input image includes a digital photograph of a whiteboard with handwritten text, a background portion of the input image may include shadows, glare, or various shades of gray across a background portion of the input image. The image enhancement system can eliminate or reduce shadows, glare, gray, or other imperfections from the background of the input image by converting background pixels to white or another uniform color. Additionally, the image enhancement system can apply modifications to background portions of the input image while effectively preserving foreground portions of the input image. For example, the image enhancement system can generate an enhanced output image having an enhanced foreground by converting the background of the input image to white without eliminating or diminishing lines, text, and other content included within the foreground of the input image.

Further, the image enhancement system can perform modifications on digital images without performing edge detection on the content within the digital images. For example, rather than analyzing an input image and specifically identifying and analyzing edges of content, background, and/or other properties within the input image, the image enhancement system can use image processing techniques that address the background and foreground simultaneously. In particular, the image enhancement system can minimize an energy heuristic that both causes pixels of the input image to change to a uniform color as well as preserving one or more gradients from within the input image. As a result, where the input image includes a photograph of a whiteboard, document, or other object having a background, the image enhancement system can generate an output image that includes a white background and a foreground that includes content that preserves gradients from within the input image.

Additionally, the image enhancement system can determine modifications and apply the determined modifications to enhance digital images without analyzing or extracting information about the foreground content or background of the input image. In particular, the image enhancement system can minimize the energy heuristic without preemptively analyzing the input image to determine which portions or pixels of the input image make up the background and/or foreground of the image. As such, the image enhancement system can generate the output image including an enhanced foreground or background without performing various computations on the image prior to determining which modifications to apply to the image or individual pixels.

As used herein, a "whiteboard image" refers to a digital image that includes a portion of a whiteboard having a background (e.g., a whiteboard) and foreground content (e.g., pictures, lines, text, handwriting). For example, a whiteboard image may refer to a photograph of a whiteboard or portion of a whiteboard captured using a mobile device. Alternatively, a whiteboard image may refer to a scanned copy of a printed photograph that includes a whiteboard or portion of a whiteboard. Additionally, while one or more embodiments described herein relate specifically to whiteboard images, it is appreciated that features and functionality described herein with regard to whiteboard images can similar be applied to other types of digital images having a background and foreground content. For example, one or more embodiments for enhancing digital images described herein can apply similarly to document images (e.g., photo including a printed document), chalkboard images (e.g., photo including a chalkboard), paper including text or handwritten notes, or other types of digital image that includes a background and foreground content.

As used herein, an "energy heuristic" refers to a method or process that is executable to identify or otherwise determine one or more values. In particular, an energy heuristic can refer to a method or process for selecting a best or optimized element with regard to one or more values or other criteria. For example, in one or more embodiments, an energy heuristic refers to one or more equations that determine one or more values or combinations of values corresponding to a minimum or optimum value. For instance, an energy heuristic can be used to analyze and determine one or more pixel values or combinations of pixel values for any number of pixels of a digital image. In one or more embodiments, an energy heuristic refers to a quadratic minimization that analyzes pixels of a digital image and solves for an image including pixels having a uniform color while preserving gradients from the digital image. As an example, an energy heuristic may refer to a Poisson equation that enables a system to solve for one or more terms or parameters.

Figure 1B:
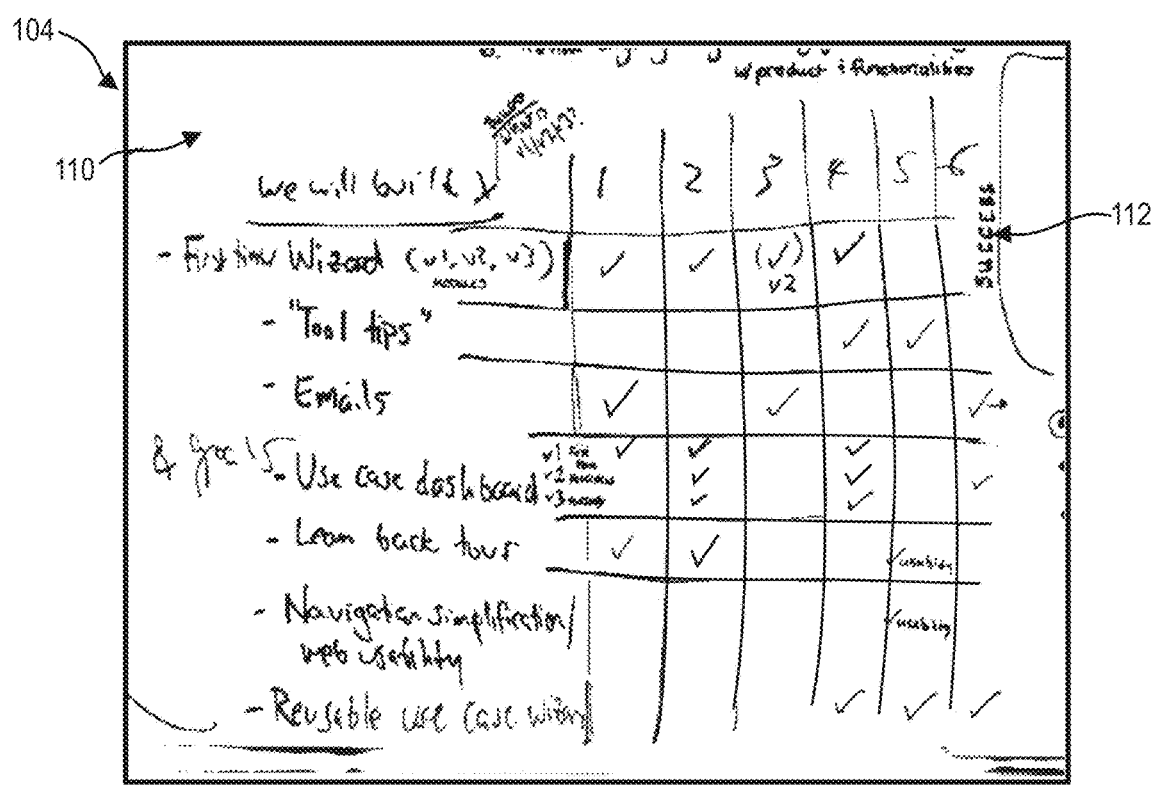
FIG. 1B illustrates an example enhanced digital image including modifications applied to the digital image of FIG. 1A in accordance with one or more embodiments.

Additional features and characteristics of one or more embodiments of the image enhancement system are described below with respect to the Figures. For example, FIGS. 1A-1B illustrate an example input image 102 and resulting output image 104 that has been enhanced in accordance with one or more embodiments described herein. In particular, as shown in FIG. 1A, input image 102 includes a digital image of a whiteboard photo having background 106 and foreground content 108. Additionally, as shown in FIG. 1B, output image 104 includes a digital image of an enhanced version of input image 102 having enhanced background 110 and enhanced foreground content 112.

In particular, FIG. 1A illustrates an example digital image of a whiteboard including background 106 and foreground content 108 having black, white, and various shades of gray. In one or more embodiments, input image 102 includes a digital photograph of a whiteboard that is captured using a client device (e.g., a mobile device). Alternatively, input image 102 can include a scan or copy of a digital photograph stored on the client device. Additionally, in one or more embodiments, input image 102 can include a scan or copy of the digital photograph that has been converted to grayscale. For example, as shown in FIG. 1A, input image 102 includes a grayscale version of a digital photograph of a whiteboard having handwritten text thereon. In alternative embodiments, the input image can comprise a color version.

As mentioned above, input image 102 includes background 106 and foreground content 108. As shown in FIG. 1A, background 106 includes a portion of the whiteboard without lines, drawings, or other content. In particular, background 106 can include any pixels (e.g., background pixels) of input image 102 corresponding to blank portions of the whiteboard that do not include lines, drawings, or other foreground content 108. In one or more embodiments, a background pixel can refer to a pixel having a pixel value in common with the majority of pixels of input image 102 or, alternatively, a pixel having a pixel value similar to neighboring pixels within the input image 102.

Additionally, as shown in FIG. 1A, foreground content 108 includes lines, text, handwriting, or any user-composed/ provided content that is viewable within input image 102. In particular, foreground content 108 can include any pixels (e.g., foreground pixels) of input image 102 corresponding to portions of the whiteboard having text, numbers, lines, or other content. In one or more embodiment, foreground pixels refer to any pixels that are not background pixels. For example, a foreground pixel can refer to a particular pixel having a contrasting pixel value between the particular pixel and one or more neighboring pixels. In one or more embodiments, foreground pixels are defined as pixels having one or more gradient values that exceed a minimum threshold.

Additionally, while background 106 would ideally be white (e.g., having a color or shade similar to that of a whiteboard) and foreground content 108 would have a color that more sharply contrasts with a color of background 106, FIG. 1A illustrates various deviations from the ideal. For example, as shown in FIG. 1A, background 106 includes various shades caused as a result of factors involved in capturing, transferring, copying, and/or converting a digital image to grayscale. Additionally, as shown in FIG. 1A, foreground content 108 includes a handwritten table, text, numbers, and other content having varying levels of thickness and different shades. In one or more embodiments, different hues of foreground content 108 are caused as a result of different colored markers used on the whiteboard.

As mentioned above, the image enhancement system can determine modifications to apply to input image 102. In particular, the image enhancement system can determine modifications to input image 102 to solve for output image 104 having a mostly white background and maintained gradients for a foreground portion of the digital image. For example, as shown in FIGS. 1A-1B, the image enhancement system can generate output image 104 including enhanced background 110 and enhanced foreground 112. In particular, enhanced background 110 can include white pixels over the majority of input image 102 while preserving gradient values of input image 102 resulting in enhanced foreground 112.

In one or more embodiments, the image enhancement system determines modifications to enhance input image 102 using an energy heuristic. For example, the image enhancement system can determine modifications to apply to one or more pixels of input image 102 by minimizing an energy heuristic including parameters to change background 106 of input image 102 to a white or otherwise uniform background color. Additionally, the energy heuristic can include one or more parameters to preserve gradient values of foreground content 108 such that enhanced foreground 112 accurately reflects foreground content 108 over enhanced background 110.

In one or more embodiments, the image enhancement system determines modifications to be applied to input image 102 by solving a quadratic minimization including foreground and background parameters. As such, as used herein an "energy heuristic" may refer to one or more types of quadratic minimization equations. In one or more embodiments, the energy heuristic can include a background parameter that specifies that pixel values of output image 104 should be entirely white unless foreground parameter indicates otherwise. For example, in one or more embodiments, the background parameter indicates that each pixel of output image 104 be white by changing RGB pixels values to 255.

Alternatively, in one or more embodiments, the background parameter can indicate one or more other pixel values corresponding to a desired color of enhanced background 110. For example, while FIG. 1B shows one example of enhanced background 110 that is white having RGB pixel values 255 across all non-gradient portions of output image 104, it is appreciated that other RGB values may be indicated for enhanced background 110 for an enhanced image. For instance, where a digital image includes a photograph of a chalkboard, the background parameter may instead specify a black or gray background to apply across enhanced background 110 that better simulates a shade of the chalkboard. Additionally, while one or more embodiments described herein relate specifically to grayscale pixels ranging from white to black (e.g., 255-0), it is appreciated that RGB values can also be considered in enhancing a digital image. For example, foreground and background parameters can include color pixel values (e.g., RGB pixel values) that are implemented in connection with one or more embodiments described herein.

In addition to the background parameter, the energy heuristic can further include one or more foreground parameters to preserve gradients within input image 104. In particular, the energy heuristic can include one or more foreground parameters that cause gradients within enhanced foreground content 112 of output image 104 to match or otherwise correspond to gradients within foreground content 108 of input image 102. For example, the energy heuristic can include a first foreground parameter that preserves x-gradients between input image 102 and output image 104 and a second foreground parameter that preserves y-gradients between input image 102 and output image 104.

The background and foreground parameters can penalize deviations from different reference points. For example, the background parameter can penalize deviations within background 106 of input image 102 from an ideally white background. In particular, as mentioned above, one or more embodiments of the background parameter include a difference between a pixel value of input image 102 and a white pixel value (e.g., 255). Thus, where the pixel value of a pixel within input image 102 is not also white, a value of the background parameter will be non-zero, thus deviating from a minimum term of zero. As a result, the background parameter may be weighted less heavily when minimizing the energy heuristic.

Additionally, one or more embodiments of the energy heuristic can include a weighted term that governs the relative weight of the different parameters. For example, the weighted term can weight individual parameters differently. In particular, one or more embodiments of the energy heuristic can weight the background parameter more heavily than the foreground parameter(s). Additionally, the weighted term can amplify or minimize deviations from non-zero values within the energy heuristic. In one or more embodiments, a user of the image enhancement system can modify the weighted term to fine-tune the enhancement of input image 102 to generate output image 104 have more or less pronounced gradients within enhanced foreground content 112 of output image 104.

In one or more embodiment, the image enhancement system applies the weighted term differently at different portions within input image 102. For example, where certain portions of input image 102 or certain gradients have a higher relative importance to other portions of input image 102, the image enhancement system can weight those pixels more heavily when minimizing the energy heuristic. In one or more embodiments, the image enhancement system determines portions of input image 102 having a higher level of importance based on, for example, gradient values, uniformity of surrounding pixels, specific pixel values, or other factor.

Alternatively, in one or more embodiments, the image enhancement system weights pixel values more heavily based on one or more user inputs. For example, a user can select a portion of a digital image to weight differently from other portions of the digital image. Additionally, in one or more embodiments, a user can manually select a weighting factor to use in determining modifications to apply to the digital image. For example, where the image enhancement system determines modifications and generates an enhanced image that fails to preserve certain gradients or, alternatively, preserves portions of the digital image that should be part of the enhanced background, the user can manually fine-tune the enhancement process by increasing, decreasing, or otherwise adjusting the weighting factor.

In one or more embodiments, the image enhancement system applies the energy heuristic to each pixel of input image 102. For example, the image enhancement system can analyze each pixel of input image 102 and minimize a background parameter and one or more foreground parameters based on each pixel value and/or one or more neighboring pixel values within input image 102. In particular, in one or more embodiments, the image enhancement system minimizes a sum between a background parameter and one or more foreground parameters for each pixel of input image 102. For example, as will be described in greater detail below, one or more embodiments of the image enhancement system minimizes a sum of squared differences in order to minimize the energy heuristic and determine output pixel values (e.g., modifications to input pixel values) to apply to input image 102 in generating output image 104.

As discussed above, the energy heuristic can include a quadratic minimization that determines modifications to apply to input image 102 by minimizing a sum of different parameters. For example, in one or more embodiments, the energy heuristic includes a screened Poisson equation including a background parameter, one or more foreground parameters, and a weighting factor. In one or more embodiments, the image enhancement system applies the screened Poisson equation to each pixel of input image 102, as described in greater detail below.

For example, the image enhancement system can determine modifications to apply to input image 102 by minimizing the following screened Poisson equation (hereinafter "Equation 1"):

$$c_0 \sum_{x,y} |J(x, y) - 255|^2 + \left|\frac{dJ}{dx}(x, y) - \frac{dI}{dx}(x, y)\right|^2 + \left|\frac{dJ}{dy}(x, y) - \frac{dJ}{dy}(x, y)\right|^2 \quad (1)$$

where I(x, y) refers to pixel values of input image 102, J(x,y) refers to pixel values of output image 104 (image J), and $c_0$ refers to a weighting factor. Further, $$\frac{dJ}{dx}$$

(x, y) refers to an x-gradient value of output image 104 at pixel location x,y and $$\frac{dI}{dx}$$

(x,y) refers to an x-gradient value of input image 102 at pixel location x,y. Additionally, $$\frac{dJ}{dy}$$

(x,y) refers to a y-gradient value of output image 104 at pixel location x,y and $$\frac{dI}{dy}$$

(x, y) refers to a y-gradient value of input image 102 at pixel location x,y.

The image enhancement system can minimize Equation 1 using various approaches. For instance, in one or more embodiments, the image enhancement system calculates an argument of the minimum for Equation 1 using the equation below (hereinafter "Equation 2"):

$$J = \mathrm{argmin}_J c_0 \Sigma |J - 255|^2 + \left|\frac{dJ}{dx} - \frac{dI}{dx}\right|^2 + \left|\frac{dJ}{dy} - \frac{dI}{dy}\right|^2 \quad (2)$$

As described above, the first term of the equation indicates that a pixel J be white and that deviations from white pixel values are penalized. For example, a first term (e.g., background parameter) of Equation 2 indicates that pixel be white, and that a pixel value that deviates from white be penalized when minimizing the equation. In addition to the first term, the equation includes additional terms that preserve one or more gradients from input image 102. For example, Equation 2 includes a second term (e.g., a first foreground parameter) that includes a difference in x-gradient values between input image 102 and output image 104. Additionally, Equation 2 includes a third term (e.g., a second foreground parameter) that includes a difference in y-gradient values between input image 102 and output image 104. As described above, the image enhancement system can calculate a minimum sum of squares for the terms of Equation 2.

Additionally, as shown in Equations 1 and 2, the minimization of terms can be scaled or weighted in accordance with a weighting factor $c_0$. As shown in FIG. 1, the weighting factor $c_0$ can scale a value of Equation 2. In one or more embodiments, the weighting factor $c_0$ further enhances foreground content 112 of output image 104 by decreasing a resulting value of a minimization. Alternatively, the weighting factor $c_0$ can scale back enhancement of foreground content 112 of output image 104 by increasing a resulting value of a minimization. In one or more embodiments, the weighting factor $c_0$ is applied to the entire equation. Alternatively, the weighting factor $c_0$ and/or other weighting factors can increase or decrease a weight of any specific parameter or combination of parameters when minimizing an energy heuristic.

While one or more embodiments involve minimizing the energy heuristic by computing and minimizing the sum of squares over an image, one or more embodiments of the image enhancement system can alternatively determine modifications to apply to input image 102 by solving for the energy heuristic (e.g., minimizing the energy heuristic) in the frequency domain. In particular, using the examples of Equation 2, the image enhancement system can transform or otherwise convert the equation to the frequency domain using a Fast Fourier Transform (FFT).

For example, the image enhancement system can determine modifications to apply to input image 102 using the following equation (hereinafter "Equation 3"):

$$J = \quad (3)$$

$$\mathrm{argmin}_J c_0 \Sigma |\mathcal{F}\{J\} - 255\}|^2 + \left|\mathcal{F}\left\{\frac{dJ}{dx} - \frac{dI}{dx}\right\}\right|^2 + \left|\mathcal{F}\left\{\frac{dJ}{dy} - \frac{dI}{dy}\right\}\right|^2 + \cdots$$

$$= \mathrm{argmin}_J c_0 \Sigma |\mathcal{F}\{J\} - \mathcal{F}\{255\}|^2 +$$

$$\left|\mathcal{F}\left\{\frac{dJ}{dx}\right\} - \mathcal{F}\left\{\frac{dI}{dx}\right\}\right|^2 + \left|\mathcal{F}\left\{\frac{dJ}{dy}\right\} - \mathcal{F}\left\{\frac{dI}{dy}\right\}\right|^2 + \cdots$$

It is appreciated that taking the x-gradient of an image is equivalent to convolving with a kernel $G_x = [1, -1]$. Additionally, it is appreciated that a convolution is equivalent to multiplication in the frequency domain (e.g., Fourier domain). As such, Equation 3 can be expressed using the following equation (hereinafter "Equation 4"):

$$J = \mathrm{argmin}_J c_0 \Sigma |\mathcal{F}\{J\} - \mathcal{F}\{255\}|^2 + |\mathcal{F}\{J * G_x\} - \mathcal{F}\{I * G_x\}|^2 + \cdots \quad (4)$$

$$= \mathrm{argmin}_J c_0 \Sigma |\mathcal{F}\{J\} - \mathcal{F}\{255\}|^2 + |\mathcal{F}\{J\}\mathcal{F}\{G_x\} - \mathcal{F}\{I\}\mathcal{F}\{G_x\}|^2 + \cdots$$

where "X* Y" refers to a convolution of X and Y.

By expanding the squared terms and eliminating any terms independent from J, Equation 4 can be further simplified as shown below. For example, it is appreciated that $|a-b|^2 = |a|^2 + |b|^2 - 2\mathcal{R}(a^* \times b)$ where $\mathcal{R}( \ldots )$ indicates the real part of the argument and $(a^* \times b)$ refers to a complex conjugate of "a" multiplied by "b." Thus, the image enhancement system can solve for J by dropping any number of terms independent from J. Further, because the objective is frequency-wise independent, there are not interactions in the objective between $\mathcal{F}\{J\}(\psi_x, \psi_y)$ and $\mathcal{F}\{\psi'_x, \psi'_y\}$. As such, the summation operation from Equation 4 can also be eliminated. Thus, Equation 4 can be expressed by doing away with the summation and using the following equation (hereinafter "Equation 5"):

$$J = \mathrm{argmin}_J c_0 |\mathcal{F}\{J\}|^2 - 2c_0 \mathcal{R}(\mathcal{F}^*\{J\}\mathcal{F}\{255\}) + \quad (5)$$

$$|\mathcal{F}\{J\}|^2 |\mathcal{F}\{G_x\}|^2 - 2\mathcal{R}(\mathcal{F}\{I\}\mathcal{F}^*\{J\}\mathcal{F}\{G_x\}\mathcal{F}^*\{G_x\}) + \cdots$$

$$= \mathrm{argmin}_J (c_0 + |\mathcal{F}\{G_x\}|^2 + |\mathcal{F}\{G_y\}|^2)|\mathcal{F}\{J\}|^2 - 2c_0 \mathcal{R}(\mathcal{F}^*\{J\}\mathcal{F}\{255\}) -$$

$$2\mathcal{R}(\mathcal{F}^*\{J\}\mathcal{F}\{I\}\mathcal{F}\{G_x\}\mathcal{F}^*\{G_x\}) - 2\mathcal{R}(\mathcal{F}^*\{J\}\mathcal{F}\{I\}\mathcal{F}\{G_y\}\mathcal{F}^*\{G_y\})$$

It is appreciated that if $\mathcal{F}\{I\}\mathcal{F}\{G_x\}\mathcal{F}*\{G_x\}$ is interpreted in the spatial domain, this is convolving I with $G_x$ and a flipped value for $G_x$. This is equivalent to convolving I with [−1,2,1], or the Laplacian. Hence, defining $L_x$ and $L_y$ using the following equations (hereinafter "Equation 6" and "Equation 7"):

$$L_x = I * [-1, 2, -1] \text{ and} \tag{6}$$

$$L_y = I * \begin{bmatrix} -1 \\ 2 \\ -1 \end{bmatrix}, \tag{7}$$

Equation 5 can be expressed using the following equation (hereinafter "Equation 8"):

$$\begin{aligned} J &= \operatorname{argmin}_J(c_0 + |\mathcal{F}\{G_x\}|^2 + |\mathcal{F}\{G_y\}|^2)|\mathcal{F}\{J\}|^2 - \\ &\qquad 2\mathcal{R}(\mathcal{F}^*\{J\}(\mathcal{F}\{L_x\} + \mathcal{F}\{L_y\} + \mathcal{F}\{255\})) \\ &= \operatorname{argmin}_J(c_0 + |\mathcal{F}\{G_x\}|^2 + |\mathcal{F}\{G_y\}|^2)|\mathcal{F}\{J\}|^2 - \\ &\qquad 2\mathcal{R}(\mathcal{F}^*\{J\}(\mathcal{F}\{L_x + L_y + 255\})) \end{aligned} \tag{8}$$

Additionally, the image enhancement system can compute the following equation (hereinafter "Equation 9") analytically, where $A_0$ is independent from the input (I).

$$\mathcal{F}\{J\} = \frac{A_1}{A_0} \tag{9}$$

In particular, the image enhancement system can compute the denominator ($A_0$) from Equation 9 using the following equation (hereinafter "Equation 10").

$$A_0 = (c_0 + |\mathcal{F}\{G_x\}|^2 + |\mathcal{F}\{G_y\}|^2) \tag{10}$$

The image enhancement system can further compute the numerator ($A_1$) from Equation 9 using the following equation (hereinafter "Equation 11"), which is a single Fourier transform.

$$A_1 = \mathcal{F}\{L_x + L_y + 255\} \tag{11}$$

Hence, the image enhancement system can express Equation 8 using the following equation (hereinafter "Equation 12"):

$$J = \operatorname{argmin}_J A_0 |\mathcal{F}\{J\}|^2 - 2\mathcal{R}(\mathcal{F}*\{J\} A_1) \tag{12}$$

As Equation 12 is a component-wise quadratic optimization, differentiating Equation 12 with respect to $\mathcal{F}\{J\}$ at each frequency yields Equation 9 above. Alternatively, the inverse of Equation 12 yields the following result (hereinafter "Equation 13"):

$$J = \mathcal{F}^{-1}\left\{\frac{A_1}{A_0}\right\} \tag{13}$$

In addition, the image enhancement system can apply a threshold value to the resulting J value to determine a binarization including modifications to apply to a digital image (e.g., input image 102) in order to generate an enhanced digital image (e.g., output image 104) having a white or other uniform colored background while preserving gradients from the foreground of the digital image. As described above, and as shown in FIG. 1, this process may be applied to input image 102 to generate output image 104 having a white background 110 and enhanced foreground content 112 with preserved gradients from foreground content 108 of input image 102.

As such, the image enhancement system can determine modifications to apply to input image 102 by converting an energy heuristic (e.g., Screened Poisson Equation) to the frequency domain and solving for one or more zero values in the frequency domain. In one or more embodiments, converting to the frequency domain enables the image enhancement system to minimize the energy heuristic using a more efficient process than minimizing or otherwise solving the energy heuristic in the spatial domain.

As shown in FIGS. 1A-1B, the image enhancement system can determine modifications to enhance a digital image including a photo of a whiteboard with hand-written content thereon. In particular, with respect to FIGS. 1A-1B, the image enhancement system can apply a white background to output image 104 where the background (e.g., blank whiteboard portion) of input image 102 would ideally be white. Applying a white background is beneficial for digital images including content that would ideally have a white background such as, for example, digital photos of whiteboards, documents, business cards, and other images that generally have white backgrounds.

In addition, the image enhancement system can compensate for other types of backgrounds that are not necessarily white, but overlap a portion of the background of a digital image. For example, if two documents within a digital image overlap, the image enhancement system can determine modifications to apply to the two documents within the digital image by minimizing an energy heuristic consistent with one or more embodiments described herein. Additionally, even if the two documents have different background colors in an original image, the image enhancement system can apply a white or other uniform colored background for each of the different documents within the original image.

Figure 2A:
FIG. 2A illustrates another example digital image including a photograph of a whiteboard with sticky notes in accordance with one or more embodiments.
Figure 2B:
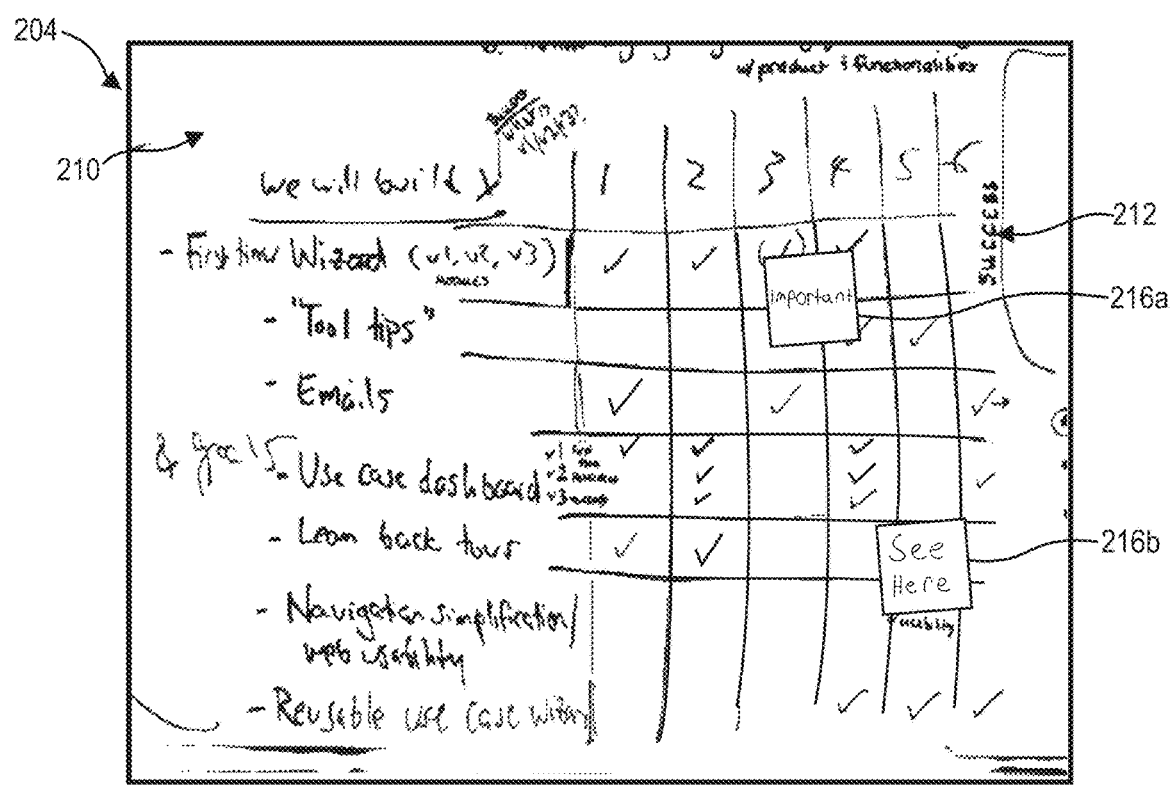
FIG. 2B illustrates another example enhanced digital image including modifications applied to the digital image of FIG. 2A in accordance with one or more embodiments.

In addition to determining modifications for enhancing digital images having multiple documents, the image enhancement system can also enhance a digital image having different elements or objects that overlap portions of the background of an object within the digital image. For example, FIGS. 2A-2B illustrate an example input image 202 and resulting output image 204 that has been enhanced in accordance with one or more embodiments described herein. In particular, as shown in FIG. 2A, input image 102 includes a digital image of a whiteboard photo having background 206 and foreground content 208 similar to background 106 and foreground content 108 described above in connection with FIG. 1A. Additionally, as shown in FIG. 1A, input image 202 includes two sticky-notes 214a-214b that overlap background 206 and foreground content 208 of input image 202.

As shown in FIG. 2A-2B, sticky-notes 214a-214b each include respective backgrounds and hand-written content thereon. For example, as shown in FIG. 2A, first sticky note 214a includes a non-white background and hand-written text that reads "Important." Further, as shown in FIG. 2A, second sticky-note 214b includes a non-white background and hand-written text that reads "See Here."

In one or more embodiments, the image enhancement system can determine modifications to apply to a digital image including multiple background portions having different colors (or different shades). For example, as shown in FIGS. 2A-2B, the image enhancement system can determine modifications to apply to input image 202 including a photograph of a whiteboard and one or more sticky-notes 214a-b overlapping portions of background 206 and foreground content 208. Additionally, as shown in FIG. 2A, sticky notes 214a-b include respective backgrounds that each have a different color from background 206 of input image 202 corresponding to a blank portion of the whiteboard. It is appreciated that the digital image can include any number of sticky-notes or other elements that have any number of different colored backgrounds.

Similar to one or more embodiments described above in connection with FIGS. 1A-1B, the image enhancement system can determine modifications to apply to input image 202 by minimizing an energy heuristic that includes background and foreground parameters. For example, referring generally to Equation 1 above, the image enhancement system can minimize a Poisson equation having a background parameter that seeks to change pixels to white as well as one or more foreground parameters that maintain gradients of input image 202 when generating output image 204. Thus, using a similar process as described above in connection with FIGS. 1A-1B, the image enhancement system can minimize an energy heuristic to determine modifications to apply to input image 202 in order to generate output image 204 having a white background 210 and enhanced foreground content 212.

Additionally, as shown in FIGS. 2A-2B, the image enhancement system can use a similar process to also modify portions of input image 202 around the sticky-notes 214a-214 to generate enhanced foreground content 212 including enhanced sticky-notes 216a-b. In particular, the image enhancement system can designate a white background parameter for all pixels within input image 202 including backgrounds of sticky-notes 214a-b. Additionally, by minimizing the energy heuristic, the image enhancement system can apply modifications that include the same white pixel value to background portions of the sticky-notes 216a-b within output image 204 while preserving the handwritten content for each of the enhanced sticky-notes 216a-b.

In particular, as shown in FIG. 2B, enhanced sticky-notes 216a-b include white backgrounds and enhanced text that correspond to the text within sticky-notes 214a-b of input image 202. Additionally, as shown in FIG. 2B, enhanced foreground content 212 includes outlines of each sticky-note 216a-b based on gradient values within input image 202 as a result of different background colors of sticky-notes 214a-b and the whiteboard. Thus, in minimizing the energy heuristic, the image enhancement system identifies a gradient between the background of the sticky-notes 214a-b and background 206 of input image 202 and thus determines that modifications to enhanced input image 202 further include an outline around each enhanced sticky-note 216a-b. Alternatively, where the background color of sticky-notes 214a-b and whiteboard are different, one or more embodiments of output image 204 exclude the outline (or include less pronounced outlines) around each of enhanced sticky-notes 216a-b within output image 204.

As such, the image enhancement system can determine modifications to apply to a digital image that includes any number of background colors by minimizing an energy heuristic that causes pixels of the digital image to change to the same uniform color across the different backgrounds within the digital image. Additionally, as described above, the image enhancement system can similarly preserve gradients from each of the different portions within the digital image having different backgrounds.

As such, minimizing the energy heuristic enhances a digital image by determining and applying modifications that include a white (or other non-uniform color) background to all background portions of image, including any number of different background portions (e.g., whiteboard, document) or elements (e.g., sticky-notes) within the digital image. Further, in one or more embodiments, the image enhancement system enhances the digital image without consideration for the number of different background portions or the different colors of the different background portions. Additionally, the image enhancement system can determine and apply modifications to enhance the digital image by minimizing the same energy heuristic across multiple backgrounds without modifying the energy heuristic to account for different background colors.

As an alternative to minimizing the same energy heuristic across an entire digital image (or across multiple backgrounds within the same digital image), in one or more embodiments, the image enhancement system determines modifications independently for different backgrounds within the image. For example, in one or more embodiments, the image enhancement system identifies different backgrounds and determines modifications for each of the identified backgrounds. In one or more embodiments, the image enhancement system minimizes an energy heuristic for different portions of the digital image associated with different backgrounds.

In particular, the image enhancement system can determine modifications to individually apply to different portions of the digital image by minimizing an energy heuristic for each of the different portions of the digital image associated with different backgrounds. Each energy heuristic can include a background parameter that indicates a particular color (or shade of gray) for each respective background in addition to one or more foreground parameters. Thus, the image enhancement system can determine modifications to apply to different portions of the digital image by minimizing respective energy heuristics having respective background parameters and foreground parameters.

In one or more embodiments, the image enhancement system autonomously determines a color of a background for each portions of the digital image. For example, the image enhancement system can analyze a digital image and determine that a background for the digital image should be white. Additionally, the image enhancement system can determine different background colors to apply to different portions or regions of the digital image.

Alternatively, in one or more embodiments, the image enhancement system receives a user input that indicates one or more background colors and/or portion(s) of the digital image to which the background color(s) should apply. For example, a user can manually select one or more portions of the digital image such as a whiteboard, document, sticky-note, or other element within the digital image. Additionally, the user can select a background color to apply to the one or more portions of the digital image. For example, in the example of FIGS. 2A-2B, the user can select a white color to apply to input image 202 for portions corresponding to a whiteboard. Additionally, the user can select a different color or shade of gray to apply to input image 202 for portions of the whiteboard corresponding to sticky-notes 214a-b. As a result, while not shown in FIG. 2B, one or more embodiments of the enhanced output image 204 include enhanced background 210 having a white color with each of enhanced sticky-notes 216a-b having a non-white color.

Figure 3A:
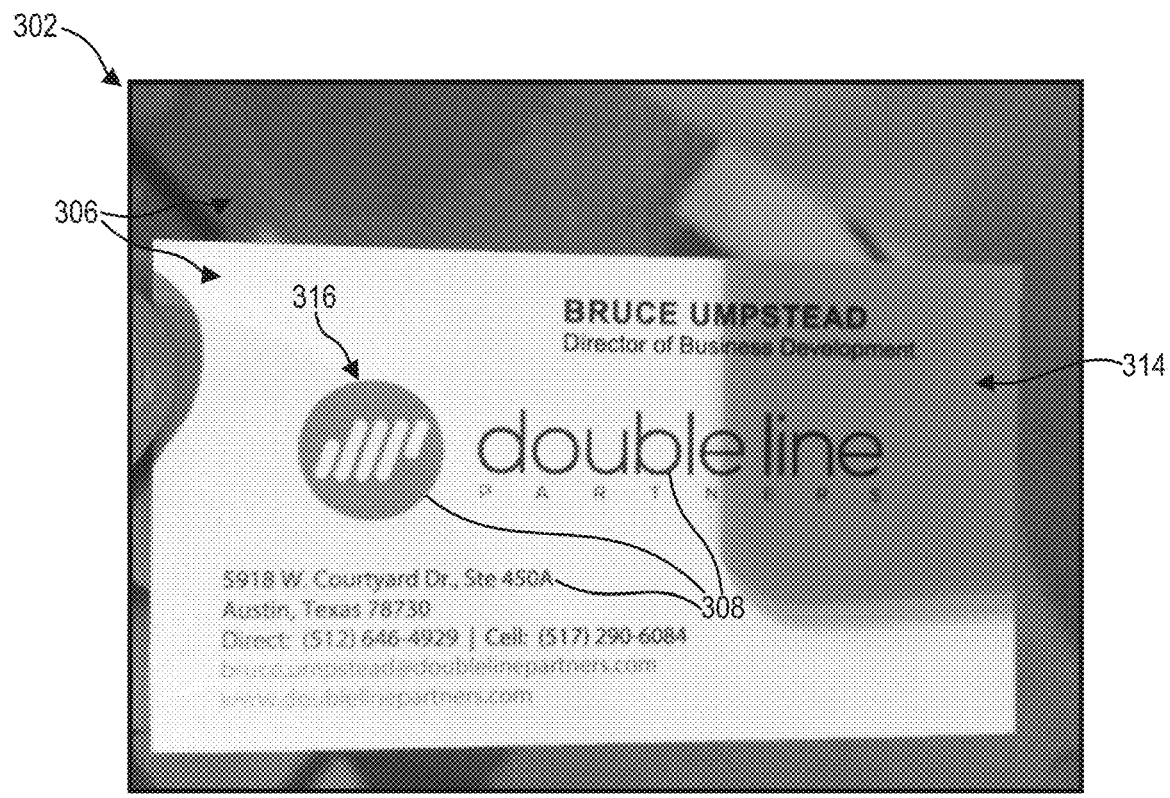
FIG. 3A illustrates an example digital image including a photograph of a business card in accordance with one or more embodiments.
Figure 3B:
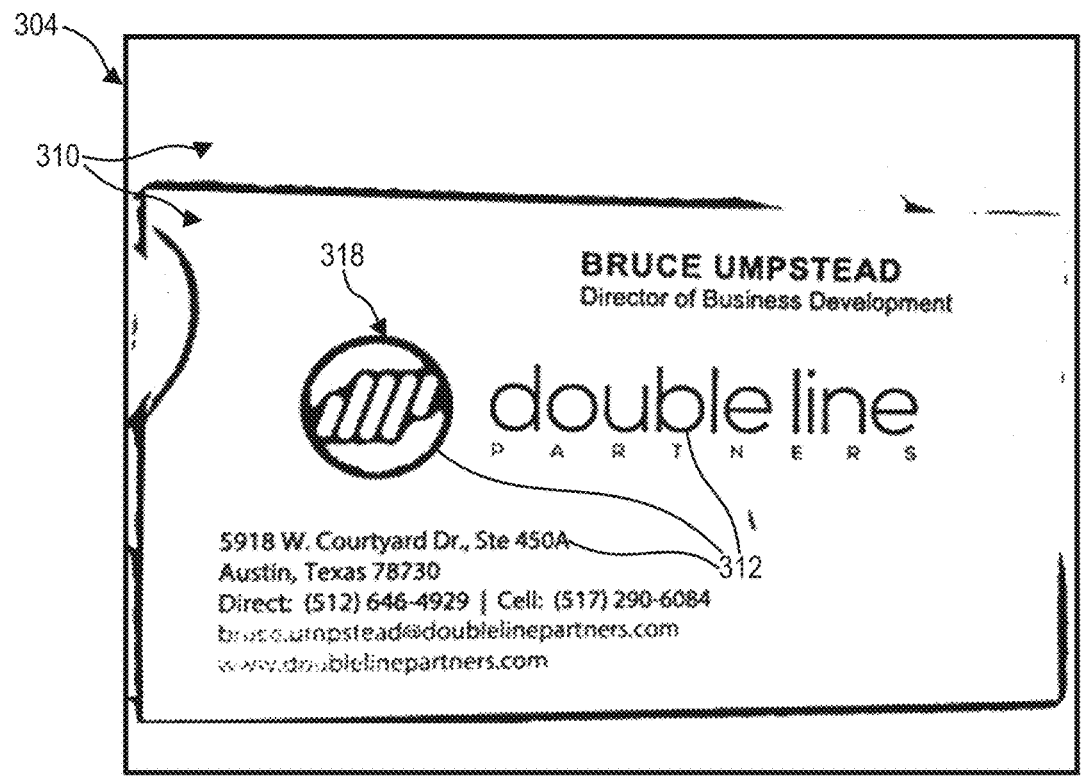
FIG. 3B illustrates an example enhanced digital image including modifications applied to the digital image of FIG. 3A in accordance with one or more embodiments.

As mentioned above, the image enhancement system can enhance images that include various types of documents. For example, FIGS. 3A-3B illustrate input image 302 including a digital photo of a business card and enhanced output image 304 including an enhanced digital photo of the business card. In particular, as shown in FIG. 3A, input image 302 includes background 306 and foreground content 308 while output image 304 includes enhanced background 310 and enhanced foreground content 312. Similar to one or more embodiments described herein, the image enhancement system can determine modifications to apply to input image 302 to generate enhanced output image 304 having a white enhanced background 310 and enhanced foreground content 312.

Additionally, as shown in FIGS. 3A-3B, the image enhancement system determines and applies modifications to input image 302 to remove shadow 314 from a portion of input image 302. For example, similar to one or more embodiments described herein, the image enhancement system can minimize an energy heuristic that includes a background parameter causing any non-gradient portions of input image 302 to be white while preserving gradient portions of input image 302. Thus, because shadow 314 does not result in gradient values that outweigh a background parameter of white, shadow 314 is removed from input image 302 when generating output 304.

As illustrated in FIG. 3A-3B, in one or more embodiments, minimizing the energy heuristic enables the image enhancement system to distinguish between different gradients within input image 302 in determining modifications to apply to different portions of input image 302. For example, while contrast between background 306 of the business card and shadow 314 inherently includes a gradient of a certain strength, the image enhancement system removes the shadow 314 because the background parameter of the energy heuristic outweighs one or more foreground parameters when minimizing the sum of terms within the energy heuristic.

Similarly, because edges of shadow 314 within input image 302 results in pixel values having different gradient values, it is appreciated that some gradient values higher than a particular threshold are preserved while other gradient values lower than a particular threshold are not preserved. For example, as shown in FIGS. 3A-3B, pixels along the edges of shadow 314 that pass over a white portion of the business card have gradients that fail to outweigh the effects of the background parameter for the energy heuristic. As such, the image enhancement system determines that pixels around the edge of shadow 314 are to be turned white in regions of output image 304, as shown in FIG. 3B. As a result, output image 304 includes enhanced background 310 and enhanced foreground content 312 in which shadow 314 is removed.

Additionally, as shown in FIGS. 3A-3B, the image enhancement system determines and applies modifications to an element (e.g., logo 316) on the business card based on a minimization of the energy heuristic. In particular, as shown in FIGS. 3A-3B, the image enhancement system causes a block portion of logo 316 to have a white background similar to enhanced background 310 resulting in a logo 318 with a hollow portion. The image enhancement system can similarly apply a white background to any block of black, gray, or other non-white color when enhancing a digital image having a block of text or other content (e.g., logo 316) due to the energy heuristic causing all pixels of the input image without a gradient to turn to white.

Figure 4A:
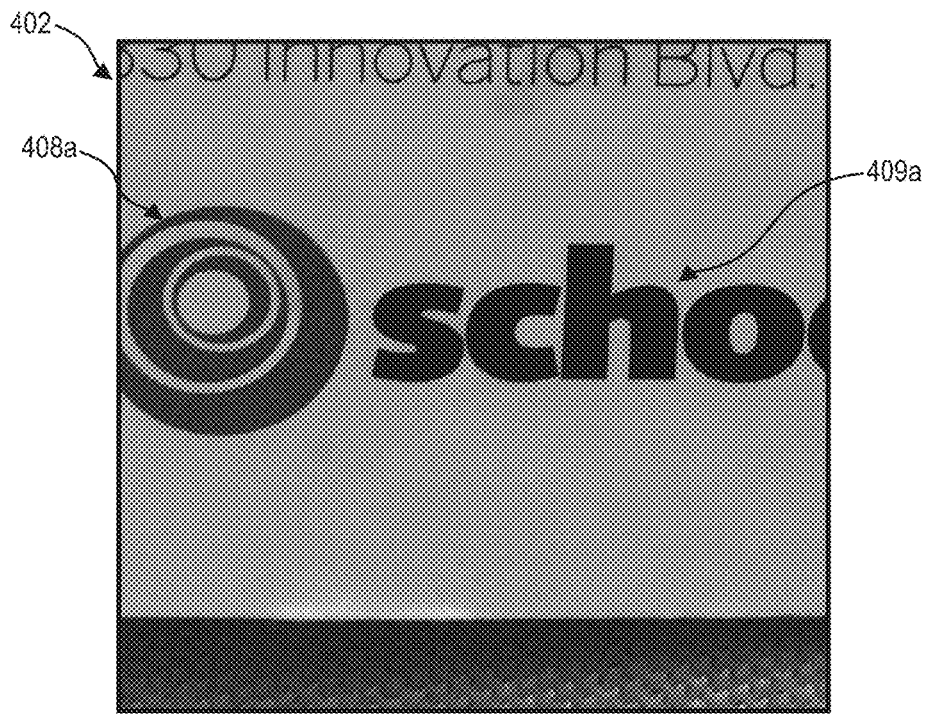
FIG. 4A illustrates an example digital image including a portion of a photograph of a document in accordance with one or more embodiments.
Figure 4B:
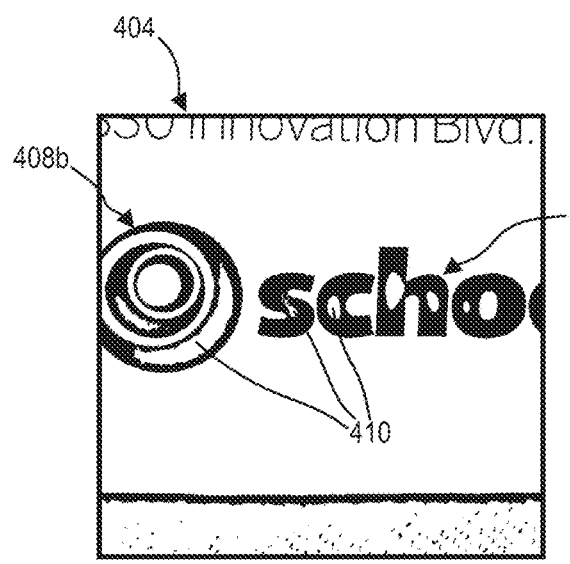
FIG. 4B illustrates an example partially enhanced digital image including modifications applied to the digital image of FIG. 4A in accordance with one or more embodiments.
Figure 4C:
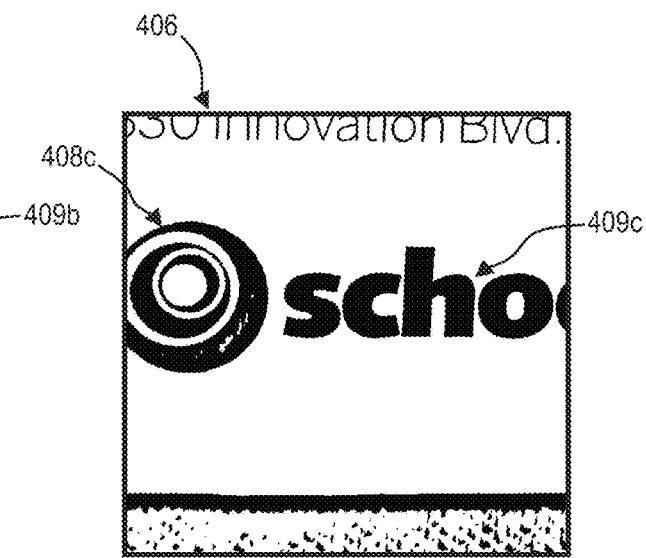
FIG. 4C illustrates an example enhanced digital image including modifications applied to the digital image of FIG. 4B in accordance with one or more embodiments.

While one or more embodiments of an enhanced digital image retain hollow portions of enhanced foreground content, one or more embodiments of the image enhancement system performs additional correction to one or more element or blocks of text within a digital image including portions that are identified as background rather than foreground. For example, as shown in FIGS. 4A-4C, the image enhancement system can determine and apply modifications to input image 402 including a portion of a photograph of a document. As shown in FIG. 4A, input image 402 includes foreground content including logo 408a and block of text 409a.

Similar to one or more embodiments described above, the image enhancement system can enhance input image 402 to generate output image 404 including a white background and enhanced foreground. Nevertheless, because of block text 409a and thickness of portions of logo 408a, the image enhancement system may change portions of the foreground content to white (i.e., portions in the middle of the logo that do not have a gradient). In particular, because portions of input image within block text 409a and logo 408a may fail to include gradients, minimizing an energy heuristic including a background parameter and one or more foreground parameters may cause the background parameter to outweigh any foreground parameter and cause output image 404 to include one or more hollow portions 410. As such, minimizing the energy heuristic on input image 402 may result in output image 404 including enhanced logo 408b and enhanced text 409b having one or more hollow portions 410.

After minimizing the energy heuristic to generate output image 404, the image enhancement system can further filter output image 404 to generate filtered image 406. In particular, the image enhancement system can filter output image 404 to remove one or more hollow portions 410 from enhanced logo 408b and enhanced block text 409b. As a result, filtered image 406 includes filtered logo 408c and filtered block text 409c that is similar to enhanced logo 408b and enhanced block text 408c without hollow portions 410 shown in output image 404.

In one or more embodiments, filtering output image 404 includes applying a cross-bilateral filter to output image 404 with respect to input image 402. In particular, the image enhancement system can blur output image 404 including hollow portions 410 without blurring out portions of output image 404 corresponding to edges of enhanced logo 408b and enhanced block text 409b. Thus, only pixels that have similar intensity within input image 402 will mix. Further, where the desired outcome includes black content on a white background, the image enhancement system can transfer black pixels onto white pixels (or hollow portions 410) by weighting the black pixels higher than the white pixels.

For example, given P(x,y) representing an output of minimizing the energy heuristic (e.g., output of screened Poisson equation) and I(x,y) representing a grayscale input image, the equation below (hereinafter "Equation 14") can define a two-channel image P'(x,y):

$$P'(x,y)=\{P(x,y)*(1.1-P(x,y)),1.1-P(x,y)\} \quad (14)$$

In particular, as shown in Equation 14, the image enhancement system can weight the black pixels at a pixel value of 1.1 while weighting the white pixels at a pixel value of 0.1. In one or more embodiments, the image enhancement system weights the black and white pixel using different values. For example, the image enhancement system can weight the black pixels at any pixel value over 1.0. Further, the image enhancement system can use the result of P'(x,y) in the following equation (hereinafter "Equation 15") to determine modification to apply to output image 404 in order to arrive at filtered image 406.

$$FilteredOutput(x,y) = \text{weighted\_mean}\{x',y'\}P'(x,y)d((x,y,l(x,y)),(x',y',l(x'y'))) \quad (15)$$

The image enhancement system can further de-homogenize the filtered output to generate the final result of filtered image 406.

It is appreciated that Equation 15 has free parameters which the image enhancement system may use in defining different metrics (e.g., "d"). Additionally, in one or more embodiments, the image enhancement system implements a diffusion filter to generate results of filtered image 406. As such, the image enhancement system can utilize either a cross-image bilateral filter or, alternatively, a diffusion filter when filtering output image 404 to arrive at filtered image 406 with hollow portions 410 removed.

Figure 5:
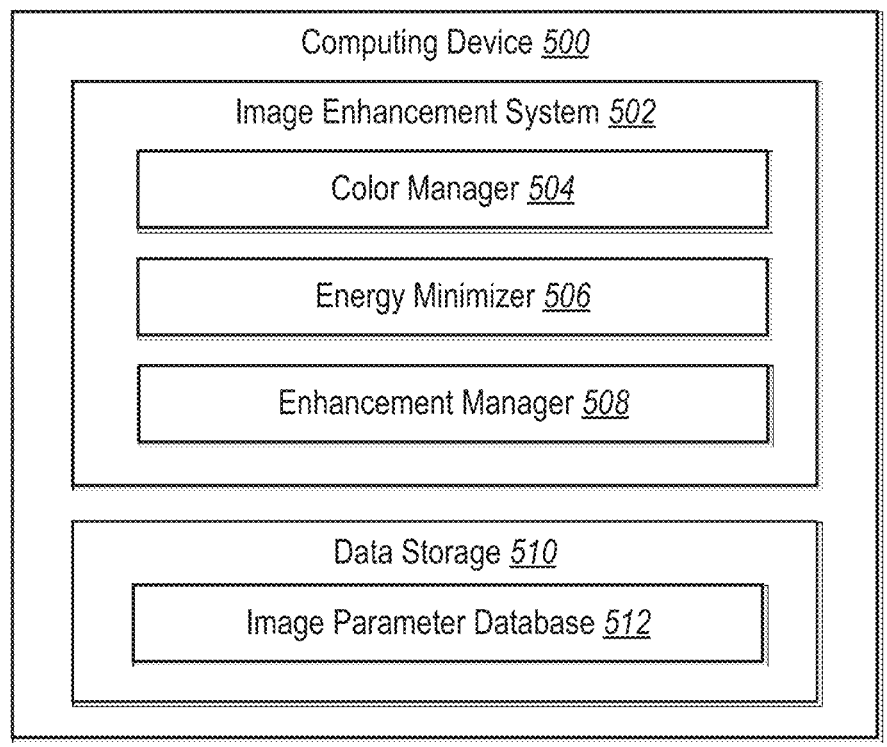
FIG. 5 illustrates a schematic diagram of an example architecture of an image enhancement system in accordance with one or more embodiments.

FIG. 5 illustrates an architecture of an example image enhancement system. As shown, the image enhancement system 502 includes color manager 504, energy minimizer 506, and enhancement manager 508. Additionally, computing device 500 can further include data storage 510 including image parameter database 512.

Each of components 502-510 of computing device 500 may be in communication with one another using any suitable communication technologies. In addition, although components 502-510 are shown separately in FIG. 5, any of components 502-510 may be combined into fewer components, such as into a single component, or divided into more components as may serve a particular embodiment. In addition, components 502-510 may be located on, or implemented by, one or more computing devices, such as one or more client devices and/or one or more server devices.

Each of components 502-510 can comprise software, hardware, or both. For example, each of components 502-510 can comprise one or more instructions stored on a computer-readable storage medium and one or more processors of one or more computing devices to execute instructions. When executed by the one or more processors, the computer-executable instructions cause a computing device to perform the methods described herein. Alternatively, components 502-510 can comprise hardware, such as a special purpose processing device to perform a certain function or group of functions.

As mentioned above, system 502 can include color manager 504. In one or more embodiments, color manager 504 can convert a digital image to grayscale. For example, upon capturing, receiving, transferring, or otherwise accessing a digital photo, color manager 504 can convert the digital image to grayscale. In one or more embodiments, color manager 504 converts the digital image to grayscale while preserving color information. For example, color manager 504 can convert the digital image to grayscale to include different shades of gray representative of different colors.

In one or more embodiments, color manager 504 converts a digital image to grayscale while enhancing contrast between background and foreground portions of the digital image. For example, in order to make hand-written text on a digital image more pronounced or more black on a white background, color manager 504 can identify minimum red, green, blue (RGB) values and normalize those values to 0 (e.g., black) in order to distinguish those minimum RGB values from background portions of the digital image. Alternatively, in converting white text on a blackboard to a grayscale image, color manager 504 can normalize maximum RGB values to 255 (or other maximum pixel value), thus creating a similar contrast between white text on a dark background.

In addition, one or more embodiments of color manager 504 filters portions of the grayscale converted image by removing noise from the grayscale converted image. For example, color manager 504 can utilize a bilateral filter to clean up the digital image when converting the digital image to grayscale. Alternatively, in one or more embodiments, the color manager 504 utilizes a diffusion filter to clean up the digital image when converting the digital image to grayscale.

Additionally, as shown in FIG. 5, system 502 further includes energy minimizer 506 that determines modifications to apply to a digital image by minimizing an energy heuristic that both causes pixels of the digital image to change to a uniform color and preserves gradients from the digital image. For example, energy minimizer 506 can minimize an energy heuristic that includes a background parameter and one or more foreground parameters that cause the majority of pixels within the digital image to be white while mimicking or otherwise preserving gradients from the digital image. In one or more embodiments, energy minimizer 506 minimizes a quadratic minimization equation such as, for example, a screened Poisson equation similar to Equation 1, described above.

In one or more embodiments, energy minimizer 506 minimizes an energy heuristic in the spatial domain. For example, energy minimizer 506 can minimize a screened Poisson equation using Equation 2 by determining the minimum of the sum of squares over the digital image as described above. Alternatively, energy minimizer 506 can minimize the energy heuristic by converting the energy heuristic to the frequency domain and solving for the converted energy heuristic in the frequency domain. For example, the image enhancement system can use a Fast Fourier Transform to convert the screened Poisson equation to the frequency domain and solve for one or more zeroes for the converted equation while in the frequency domain.

Additionally, as shown in FIG. 5, system 502 further include enhancement manager 508. In one or more embodiments, enhancement manager 508 applies one or more determined modifications to a digital image to generate an enhanced digital image having a uniform background color and enhanced foreground content. For example, in response to minimizing the energy heuristic and determining modifications to apply to a digital image, enhancement manager 508 can apply the determined modifications to the digital image to generate an enhanced digital image having an enhanced foreground and a uniform background.

In addition to applying modifications determined as a result of minimizing the energy heuristic, enhancement manager 510 can perform one or more additional modifications to the enhanced digital image. In particular, where an output image refers to an enhanced digital image as a result of minimizing the energy heuristic with respect to an input image, enhancement manager 510 can further modify the output image to further refine the output image to generate a further enhanced output image.

For example, in one or more embodiments, enhancement manager 510 filters the output image using one or more filters. In particular, enhancement manager 510 can utilize a bilateral filter to remove one or more hollow portions within the output image. Alternatively, in one or more embodiments, enhancement manager 510 utilizes a diffusion filter to remove hollow portions within the output image.

Additionally, enhancement manager 508 can perform one or more additional modifications to an output image to further enhance text or other foreground content that minimizing the energy heuristic may fail to identify or otherwise enhance. For example, where thin or small text results in aliasing or other distortions within an output image, enhancement manager 508 can perform one or more iterations of a matting algorithm on the output image to further enhance the output image. In particular, enhancement manager 508 can perform a first iteration of the matting algorithm by building a trimap based on results of output image (e.g., results of minimizing the energy heuristic, output of screened Poisson equation). In particular, enhancement manager 508 can build a trimap by classifying any pixel marked as black as "known foreground" while marking any pixel within a fixed radius (e.g., 16 pixels) of the known foreground as "unknown." Additionally, any pixel not classified as "known foreground" or "unknown" can be classified as "known background."

For each pixel of the output image, enhancement manager 508 can estimate the average known background and known foreground pixel values from a local neighborhood. Enhancement manager 508 estimates this average looking at known (e.g., known background, known foreground) pixels. Based on the determined average, enhancement manager 508 can assign an alpha value to each pixel. Enhancement manager 508 can perform multiple iterations for each pixel, which results in multiple "unknown" pixels having associated alpha values. After performing multiple iterations (e.g., 2 or 3), enhancement manager 508 can classify any remaining pixels that are "unknown" as "known background." As a result of performing one or more iterations of the matting algorithm, enhancement manager 508 generates a per-pixel alpha map, or a binary map.

Upon generating the binary map, enhancement manager 508 can map the mask against a digital image (e.g., input image) by using pixels from the digital image wherever the map is black and use white elsewhere. Additionally, enhancement manager 508 can blend appropriate gray or colors if the mask is a fractional value (e.g., based on a corresponding alpha value). Thus, similar to one or more embodiments described above, enhancement manager 508 can further enhance the output image by masking the binary map against an input digital image to generate the enhanced digital image having a white background and enhanced foreground content.

Additionally, in one or more embodiments, enhancement manager 508 can correct a perceptual color shift. In particular, because colors from a foreground portion of a digital image are enhanced such that the foreground portion is against a pure white image, enhancement manager 508 can boost the saturation of the output image to help normalize the colors against the background. As a result, enhancement manager 508 can further modify the output image to include a further modified digital image having modified colors for the enhanced foreground that better reflect colors of an original photograph or original content from which the digital image was obtained.

As mentioned above, and as shown in FIG. 5, computing device 500 can further include data storage 510 including image parameter database 512. In particular, image parameter database 512 can include any information associated with parameters or terms used in connection with an energy heuristic. For example, where the energy heuristic includes a screened Poisson equation (e.g., Equation 1), image parameter database 512 can include a white background parameter that causes the majority of pixels within a digital image to change to white when minimizing the energy heuristic. Image parameter database 512 can include any number of background parameters associated with different colors, hues, shades of gray, or other uniform color that can be applied across the background of an enhanced digital image. Additionally, image parameter database 512 can include one or more foreground parameters that preserves gradients from within a digital image. Image parameter database 512 can include any number of foreground parameters associated with different thicknesses, contrasts, thresholds, or other values that may be used in preserving gradients within a digital image.

Figure 6:
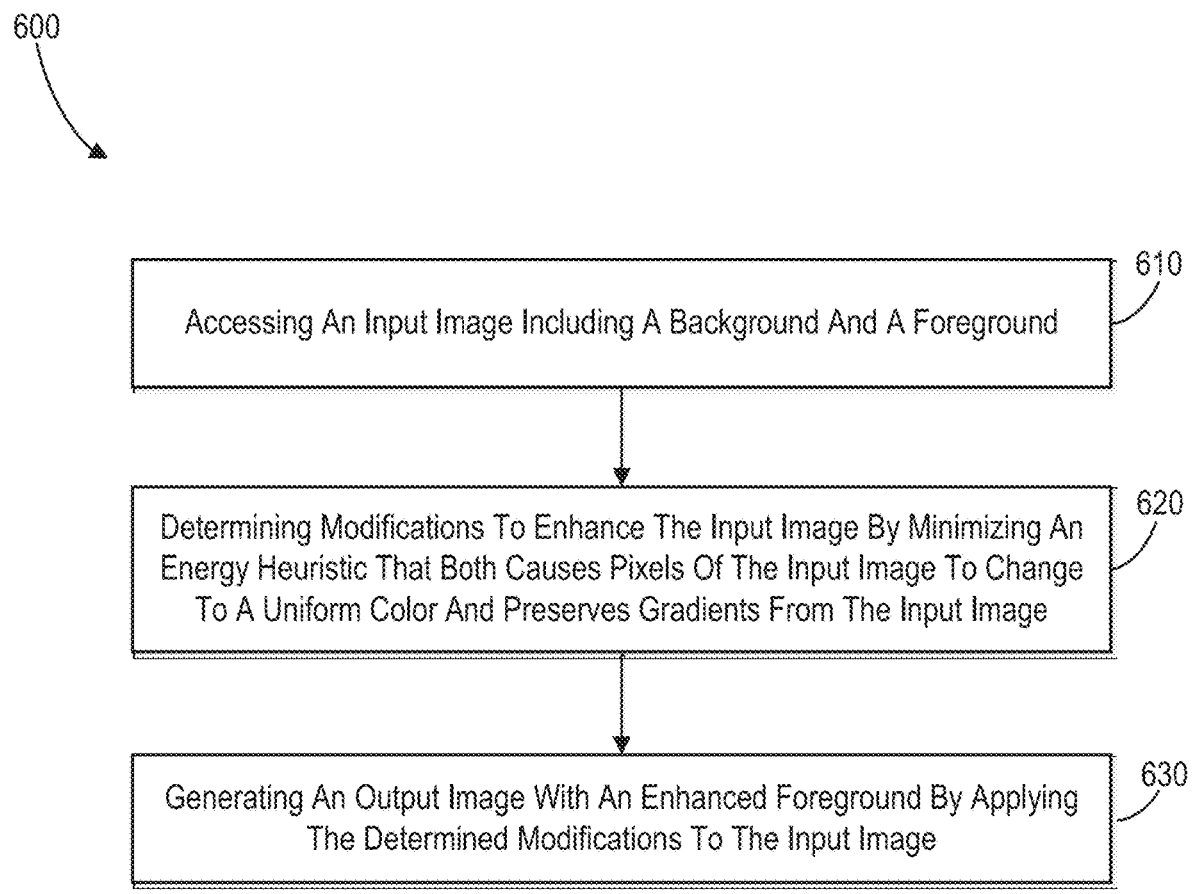
FIG. 6 illustrates a flowchart of a series of acts in a method of enhancing a digital image in accordance with one or more embodiments.

FIG. 6 illustrates a flowchart of one example method 600 of enhancing a digital image. While FIG. 6 illustrates example steps according to one embodiment, other embodiments may omit, add to, reorder, and/or modify any of the steps shown in FIG. 6. One or more steps shown in FIG. 6 may be performed by any of the components illustrated in computing device 500 illustrated in FIG. 5.

As shown in FIG. 6, method 600 includes act 610 of accessing an input image including a background and a foreground. In one or more embodiments, the input image includes a digital photograph of a whiteboard with written text. Further, it is appreciated that the input image as described in connection with method 600 can include any digital image having a background and foreground content. For example, the input image can include similar features and properties as input images 102, 202, 302, 402 described above in connection with FIGS. 1A-4C.

In one or more embodiments, method 600 includes converting the input image to grayscale. In one or more embodiments, converting the input image to grayscale involves identifying one or more minimum red green blue (RGB) pixel values across the input image. Additionally, converting the input image to grayscale can involve normalizing the one or more minimum RGB pixel values to zero. Alternatively, in one or more embodiments, converting the input image to grayscale involves identifying one or more maximum RGB pixel values and normalizing the maximum RGB pixel value(s) to a predefined maximum pixel value.

As shown in FIG. 6, method 600 further includes act 620 of determining modifications to enhance the input image by minimizing an energy heuristic that both causes pixels of the input image to change to a uniform color and preserves gradients from the input image. For example, act 620 can involve determining, by at least one processor, modifications to enhance the input image by minimizing an energy heuristic that both causes pixels of the input image to change to a uniform color and preserves gradients from the input image. In one or more embodiments, the energy heuristic includes a quadratic minimization equation. For example, the energy heuristic can include a screened Poisson equation.

In one or more embodiments, act 620 involves minimizing an energy heuristic that includes a background parameter that causes the background of the input image to change to a uniform color. For example, the background parameter can cause the background of the input image to change to a white color. Additionally, in one or more embodiments, act 620 involves minimizing an energy heuristic that includes one or more foreground parameters that preserve gradients from the input image. For example, a first foreground parameter can preserve horizontal gradients from the input image. Additionally, a second foreground parameter can preserve vertical gradients from the input image.

Additionally, as shown in FIG. 6, method 600 further includes act 630 of generating an output image with an enhanced foreground by applying the determined modifications to the input image. For example, act 630 can involve generating, by the at least one processor, an output image with an enhanced foreground by applying the determined modifications to the input image. In one or more embodiments, act 630 of generating the output image involves applying white color (or other uniform color) to non-gradient portions of the input image. Additionally, in one or more embodiments, act 630 of generating the output image involves blending color from the input image to the output image. For example, blending color from the input image to the output image can involve adding color to the enhanced foreground based on fractional values of gradients from the input image.

Further, as mentioned above, method 600 can include determining modifications to enhance the input image that involves minimizing an energy heuristic. In one or more embodiments, determining modifications to enhance the input image involves converting the energy heuristic to the frequency domain. In particular, converting the energy heuristic to the frequency domain can involve performing a Fast Fourier Transform (FFT) on the energy heuristic in the spatial domain. Additionally, determining modifications to enhance the input image can involve minimizing the energy heuristic by solving for one or more zero values for the converted energy heuristic.

Additionally, in one or more embodiments, method 600 can include filtering the output image to further enhance the output image. For example, method 600 can include filtering the output image to fill in or otherwise remove hollow portions of the enhanced foreground. For example, filtering the output image can involve applying a cross-bilateral filter to the output image with respect to the input image. Alternatively, in one or more embodiments, filtering the output image involves applying a diffusion filter to the output image with respect to the input image.

Additionally, in one or more embodiments, filtering the output image involves generating a binarization map to apply to the input image based on the determined modifications to enhanced the input image. For example, in one or more embodiments, generating the binarization map involves generating a trimap based on an output of the energy heuristic that classifies portions of the output image as foreground, background, and unknown. Additionally, generating the binarization map can involve determining, for each pixel within the output image, a pixel value based on neighboring foreground and background portions of the output image. Further, generating the binarization map can involve generating a binarization map including pixel values to apply to the input image based on the determined pixel value for each pixel within the output image. Further, in one or more embodiments, generating the output image with the enhanced foreground by applying the determined modifications to the input image involves masking the binarization map to the input image.

Figure 7:
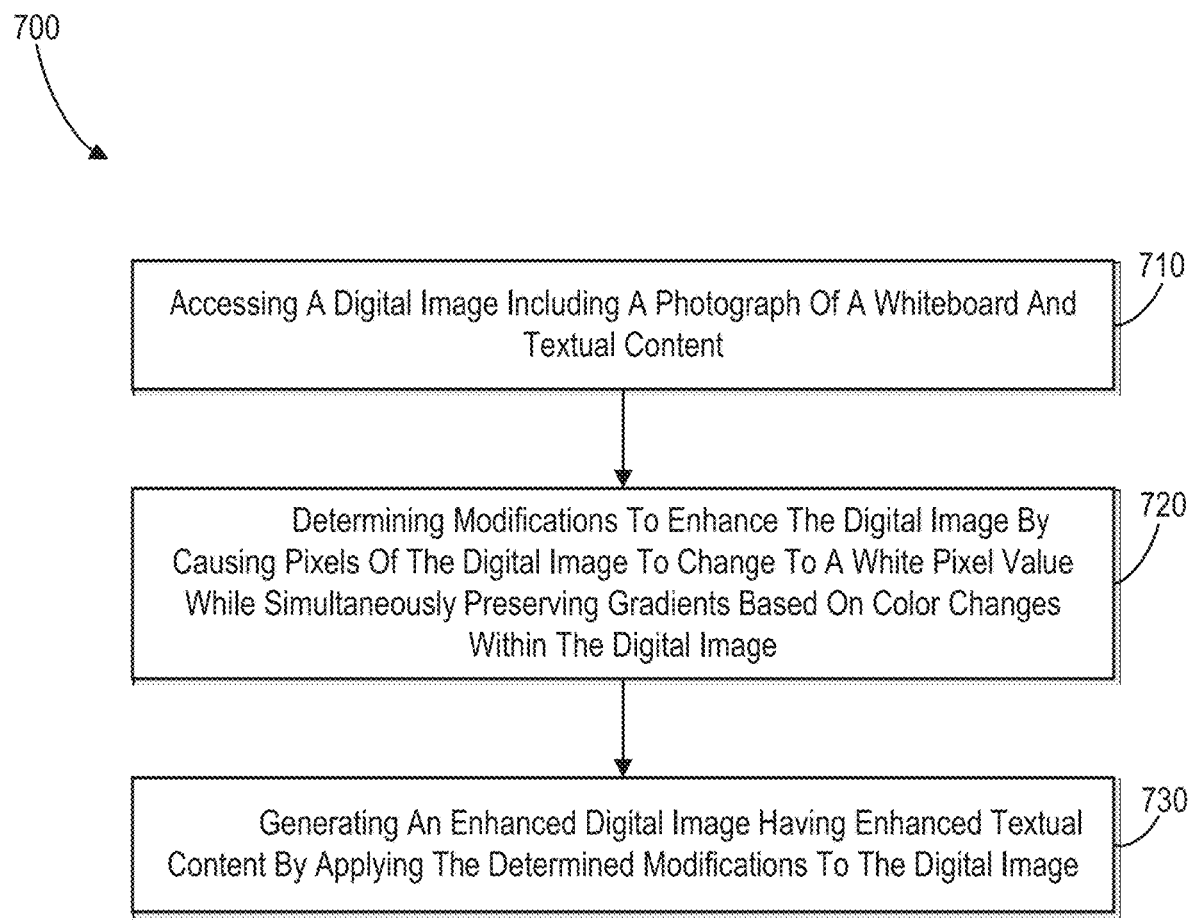
FIG. 7 illustrates another flowchart of a series of acts in a method of enhancing a digital image in accordance with one or more embodiments.

FIG. 7 illustrates a flowchart of one example method 700 of enhancing a digital image. While FIG. 7 illustrates example steps according to one embodiment, other embodiments may omit, add to, reorder, and/or modify any of the steps shown in FIG. 7. One or more steps shown in FIG. 7 may be performed by any of the components illustrated in computing device 500 illustrated in FIG. 5.

As shown in FIG. 7, method 700 includes act 710 of accessing a digital image including a photograph of a whiteboard and textual content. For example, the digital image can include a photograph of a whiteboard and textual content similar to input images 102, 202 described above in connection with FIGS. 1A-2B. Additionally, it is appreciated that the digital image can include similar features and properties as described above in connection with any of input images 102, 202, 302, 402 described above in connection with FIGS. 1A-4C.

Further, as shown in FIG. 7, method 700 includes act 720 of determining modifications to enhanced the digital image by causing pixels of the digital image to change to a white pixel value while simultaneously preserving gradients based on color changes within the digital image. In particular, act 720 can involve determining, by at least one processor, modifications to enhance the digital image by causing pixels of the digital image to change to a white pixel value while simultaneously preserving gradients based on color changes within the digital image. In one or more embodiments act 720 of determining modifications to enhance the digital image involves similar steps and features as determining modifications to enhanced the input image as described above in connection with FIG. 6.

Additionally, in one or more embodiments, determining the modifications to enhance the digital image involves calculating a minimum value of a sum of squared parameters. The squared parameters can include a background parameter including an indication that the enhanced digital image be entirely white. Additionally, the squared parameters can include one or more foreground parameters including a different between gradient values of the digital image and the enhanced digital image. Additionally, in one or more embodiments, method 700 involves converting the sum of the squared parameters to a frequency domain Further, calculating the minimum value of the sum of squared parameters can involve solving for one or more zero values for the converted sum of squared parameters.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
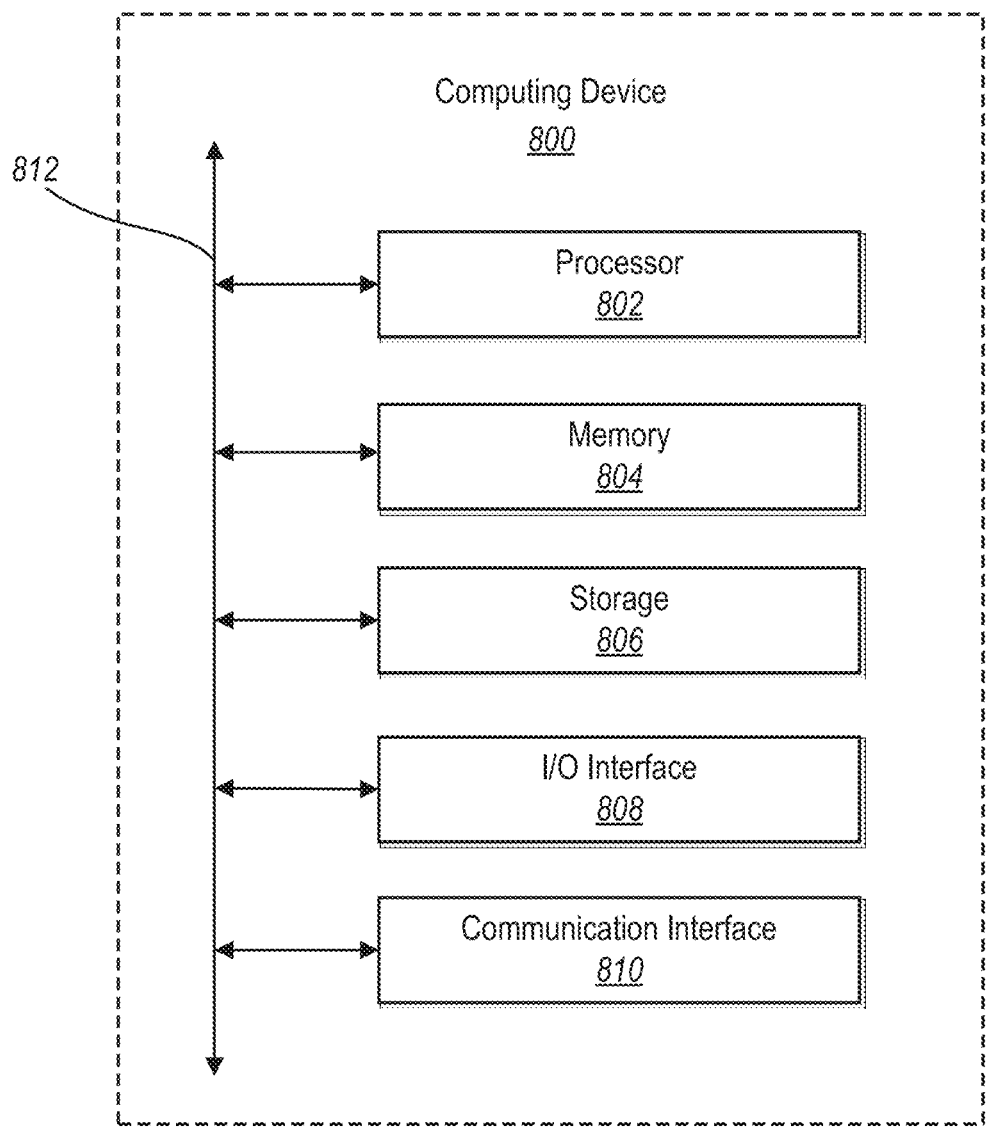
FIG. 8 illustrates a block diagram of a computing device in accordance with one or more embodiments.

FIG. 8 illustrates a block diagram of exemplary computing device 800 that may be configured to perform one or more of the processes described above. One will appreciate that computing device 500 may be implemented by one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
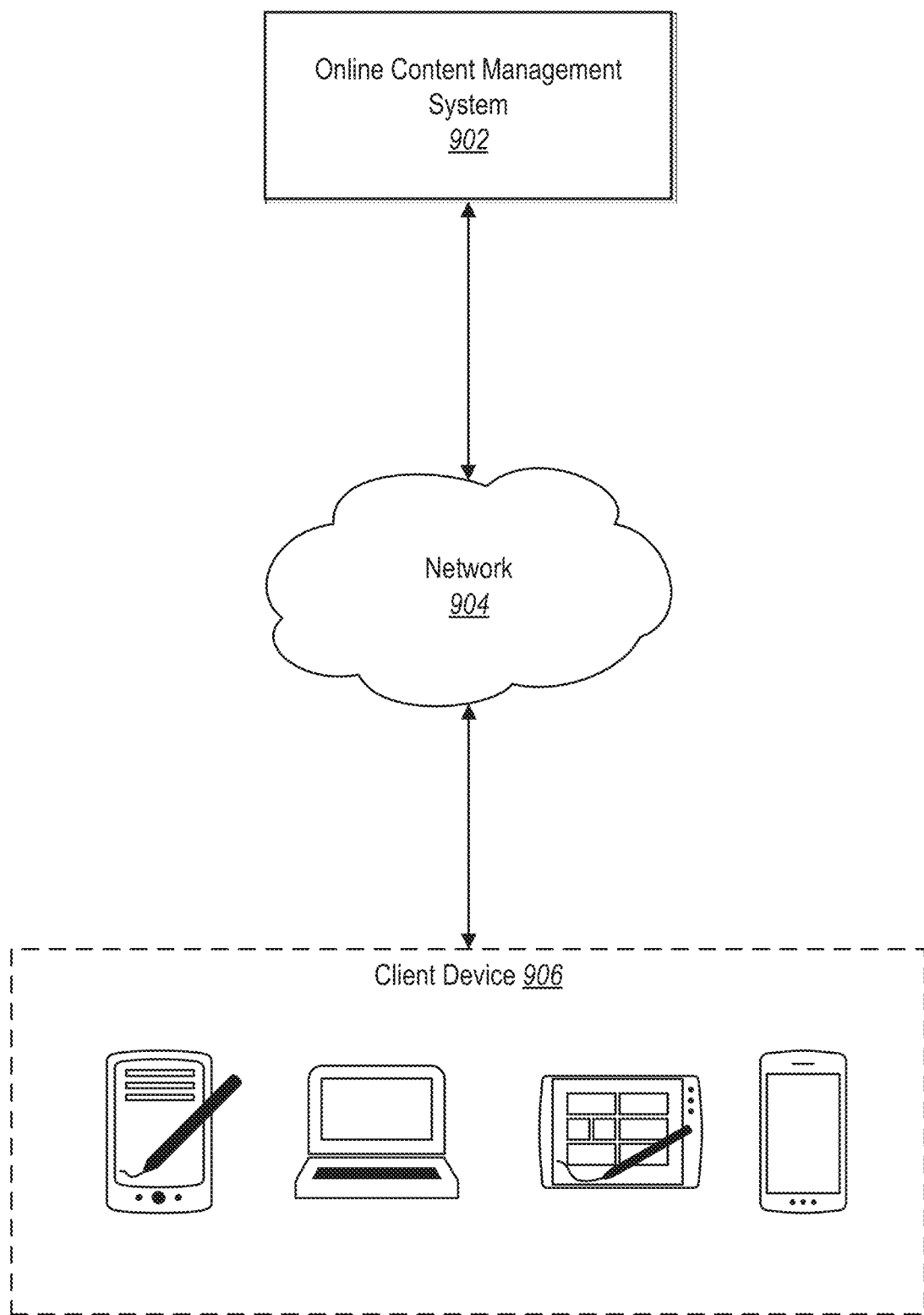
FIG. 9 illustrates a networking environment of an online content management system in accordance with one or more embodiments.

FIG. 9 is a schematic diagram illustrating an environment within which one or more embodiments of image enhancement system 502 can be implemented. Online content management system 902 may generate, store, manage, receive, and send digital content. For example, online content management system 902 may send and receive digital content to and from client devices 906 by way of network 904. In particular, online content management system 902 can store and manage a collection of digital content. Online content management system 902 can manage the sharing of digital content between computing devices associated with a plurality of users. For instance, online content management system 902 can facilitate a user sharing a digital content with another user of online content management system 902.

In particular, online content management system 902 can manage synchronizing digital content across multiple client devices 906 associated with one or more users. For example, a user may edit digital content using client device 906. The online content management system 902 can cause client device 906 to send the edited digital content to online content management system 902. Online content management system 902 then synchronizes the edited digital content on one or more additional computing devices.

In addition to synchronizing digital content across multiple devices, one or more embodiments of online content management system 902 can provide an efficient storage option for users that have large collections of digital content. For example, online content management system 902 can store a collection of digital content on online content management system 902, while the client device 906 only stores reduced-sized versions of the digital content. A user can navigate and browse the reduced-sized versions (e.g., a thumbnail of a digital image) of the digital content on client device 906. In particular, one way in which a user can experience digital content is to browse the reduced-sized versions of the digital content on client device 906.

Another way in which a user can experience digital content is to select a reduced-size version of digital content to request the full- or high-resolution version of digital content from online content management system 902. In particular, upon a user selecting a reduced-sized version of digital content, client device 906 sends a request to online content management system 902 requesting the digital content associated with the reduced-sized version of the digital content. Online content management system 902 can respond to the request by sending the digital content to client device 906. Client device 902, upon receiving the digital content, can then present the digital content to the user. In this way, a user can have access to large collections of digital content while minimizing the amount of resources used on client device 906.

Client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access online content management system 902.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
accessing an input image depicting an object comprising:
foreground content comprising first color foreground content and second color foreground content, wherein the foreground content comprises a non-shadow foreground portion and a shadow foreground portion, and
a background comprising a non-shadow background portion and a shadow background portion; and
generating, by at least one processor, an enhanced output image based on modifying the input image, wherein modifying the input image comprises:
modifying the non-shadow background portion and the shadow background portion of the background to be a uniform background color to create a uniform background within the enhanced output image, and
modifying the shadow foreground portion of the foreground content to create uniform first color foreground content and uniform second color foreground content within the enhanced output image.

2. The method of claim 1, wherein the uniform first color foreground content is a different color than the uniform second color foreground content.

3. The method of claim 1, wherein creating the uniform first color foreground content and the uniform second color foreground content further comprises modifying the non-shadow foreground portion of the foreground content.

4. The method of claim 1, further comprising converting the enhanced output image to grayscale by changing the uniform first color foreground content to a first shade of gray and the uniform second color foreground content to a second shade of gray.

5. The method of claim 1, wherein the input image is captured by a camera on a mobile device.

6. The method of claim 1, further comprising:
identifying the non-shadow background portion by identifying at least a first group of pixels having gradient values within a first range of gradient values;
identifying the shadow background portion by identifying at least a second group of pixels having gradient values within a second range of gradient values; and
wherein modifying the non-shadow background portion and the shadow background portion comprises changing the first group of pixels and the second group of pixels to the uniform background color.

7. The method of claim 1, wherein the uniform background color is white.

8. The method of claim 1, further comprising causing the enhanced output image to be stored on a content management system.

9. The method of claim 1, further comprising:
receiving an indication of a user input to adjust the enhanced output image; and
adjusting one or more of the uniform background color, the uniform first color foreground content, or the uniform second color foreground content based on receiving the indication of user input to adjust the enhanced output image.

10. A system comprising:
at least one processor; and
at least one non-transitory computer-readable storage medium storing instructions that, when executed by the at least one processor, cause the system to:
access an input image depicting an object comprising:
foreground content comprising first color foreground content and second color foreground content, wherein the foreground content comprises a non-shadow foreground portion and a shadow foreground portion, and
a background comprising a non-shadow background portion and a shadow background portion; and
generate an enhanced output image based on modifying the input image, wherein modifying the input image comprises:
modifying the non-shadow background portion and the shadow background portion of the background to be a uniform background color to create a uniform background within the enhanced output image, and
modifying the shadow foreground portion of the foreground content to create uniform first color foreground content and uniform second color foreground content within the enhanced output image.

11. The system of claim 10, wherein creating the uniform first color foreground content and the uniform second color foreground content further comprises modifying the non-shadow foreground portion of the foreground content.

12. The system of claim 10, wherein the uniform first color foreground content is a different color than the uniform second color foreground content.

13. The system of claim 10, further comprising instructions that, when executed by the at least one processor, cause the system to convert the enhanced output image to grayscale by changing the uniform first color foreground content to a first shade of gray and the uniform second color foreground content to a second shade of gray.

14. The system of claim 10, further comprising instructions that, when executed by the at least one processor, cause the system to:
receive an indication of a user input to adjust the enhanced output image; and
adjust one or more of the uniform background color, the uniform first color foreground content, or the uniform second color foreground content based on receiving the indication of user input to adjust the enhanced output image.

15. The system of claim 10, wherein modifying the shadow portion of the foreground content comprises minimizing an energy heuristic.

16. A non-transitory computer readable medium storing instructions thereon that, when executed by at least one processor, cause a computing device to:
access an input image depicting an object comprising:
foreground content comprising first color foreground content and second color foreground content, wherein the foreground content comprises a non-shadow foreground portion and a shadow foreground portion, and
a background comprising a non-shadow background portion and a shadow background portion; and
generate an enhanced output image based on modifying the input image, wherein modifying the input image comprises:
modifying the non-shadow background portion and the shadow background portion of the background to be a uniform background color to create a uniform background within the enhanced output image, and
modifying the shadow foreground portion of the foreground content to create uniform first color foreground content and uniform second color foreground content within the enhanced output image.

17. The non-transitory computer readable medium of claim 16, wherein the uniform first color foreground content is a different color than the uniform second color foreground content.

18. The non-transitory computer readable medium of claim 16, further comprising instructions that, when executed by the at least one processor, cause the computing device to convert the enhanced output image to grayscale by changing the uniform first color foreground content to a first shade of gray and the uniform second color foreground content to a second shade of gray.

19. The non-transitory computer readable medium of claim 16, further comprising instructions that, when executed by the at least one processor, cause the computing device to:
receive an indication of a user input to adjust the enhanced output image; and
adjust one or more of the uniform background color, the uniform first color foreground content, or the uniform second color foreground content based on receiving the indication of user input to adjust the enhanced output image.

20. The non-transitory computer readable medium of claim 16, wherein creating the uniform first color foreground content and the uniform second color foreground content further comprises modifying the non-shadow foreground portion of the foreground content.

* * * * *